US012196390B1

(12) United States Patent
Cohen

(10) Patent No.: US 12,196,390 B1
(45) Date of Patent: Jan. 14, 2025

(54) RECESSED LIGHTING ASSEMBLY AND PORTIONS THEREOF

(71) Applicant: Brandon Cohen, Vernon, CA (US)

(72) Inventor: Brandon Cohen, Vernon, CA (US)

( * ) Notice: Subject to any disclaimer, the term of this patent is extended or adjusted under 35 U.S.C. 154(b) by 269 days.

(21) Appl. No.: 17/725,380

(22) Filed: Apr. 20, 2022

Related U.S. Application Data

(63) Continuation-in-part of application No. 17/068,618, filed on Oct. 12, 2020, now Pat. No. 11,092,326, and
(Continued)

(51) Int. Cl.
*H02G 3/08* (2006.01)
*F21S 8/02* (2006.01)
(Continued)

(52) U.S. Cl.
CPC .............. *F21S 8/026* (2013.01); *F21V 23/02* (2013.01); *F21V 29/89* (2015.01)

(58) Field of Classification Search
CPC ........ H02G 3/08; H02G 13/081; H02G 3/083; H02G 3/12; H02G 3/121; H02G 3/123; H02G 3/126; H02G 3/10; H02G 3/081; H05K 5/00; H05K 5/02; H05K 5/0204; H05K 5/0217; F21V 21/04; F21V 21/042;
(Continued)

(56) References Cited

U.S. PATENT DOCUMENTS

| | | | |
|---|---|---|---|
| 1,133,535 | A | 3/1915 | Cain |
| 1,471,340 | A | 10/1923 | Knight |

(Continued)

FOREIGN PATENT DOCUMENTS

| | | | |
|---|---|---|---|
| EP | 3521688 | A1 | 7/2019 |
| WO | WO2010051985 | A1 | 5/2010 |

(Continued)

OTHER PUBLICATIONS

US 10,816,169 B1, 10/2020, Danesh (withdrawn)

(Continued)

*Primary Examiner* — Angel R Estrada
(74) *Attorney, Agent, or Firm* — Eric Kelly

(57) ABSTRACT

A mounting-frame is configured for use in a recessed lighting assembly and may have a main-planar-member, an aperture-for-housing-can, two mounting-ears, and a skirt. The main-planar-member may be at least mostly flat and planar, aside from some extensions. The aperture-for-housing-can may be a hole within the main-planar-member that may be configured to receive at least a portion of a housing-can. The housing-can is configured to house a light source. The two mounting-ears may extend orthogonally above the main-planar-member and may extend from opposing sides of the aperture-for-housing-can. The two mounting-ears may be configured for attaching to the housing-can. The skirt may extend from the main-planar-member, at the aperture-for-housing-can, in an opposite direction from the mounting-ears. The two mounting-ears may be formed from material of the main-planar-member such that the two mounting-ears and the main-planar-member are integral with each other being of the same article of manufacture.

20 Claims, 28 Drawing Sheets

Related U.S. Application Data a continuation-in-part of application No. 16/790,345, filed on Feb. 13, 2020, now Pat. No. 11,460,157.

(51) Int. Cl.
*F21V 23/02* (2006.01)
*F21V 29/89* (2015.01)

(58) Field of Classification Search
CPC . F21V 21/048; F21V 23/06; F21S 8/00; F21S 8/026
USPC ....... 174/480, 481, 50, 53, 57, 58, 535, 542, 174/560, 559, 54, 61, 63; 220/3.2–3.9, 220/4.02; 248/906, 343, 317, 342
See application file for complete search history.

(56) References Cited

U.S. PATENT DOCUMENTS

| | | | | |
|---|---|---|---|---|
| 1,856,356 | A | 5/1932 | Owen | |
| 2,352,913 | A | 7/1944 | Parker | |
| 2,758,810 | A | 8/1956 | Good | |
| 2,802,933 | A | 8/1957 | Broadwin | |
| 3,104,087 | A | 9/1963 | Budnick | |
| 3,773,968 | A | 11/1973 | Copp | |
| 3,913,773 | A | 10/1975 | Copp | |
| 4,880,128 | A | 11/1989 | Jorgensen | |
| 4,919,292 | A | 4/1990 | Hsu | |
| 5,303,894 | A | 4/1994 | Deschamps | |
| 5,420,376 | A | 5/1995 | Rajecki | |
| 5,588,737 | A * | 12/1996 | Kusmer | F21V 19/0005 174/67 |
| 5,690,423 | A * | 11/1997 | Hentz | F21S 8/02 248/302 |
| 5,957,573 | A | 9/1999 | Wedekind | |
| 6,521,833 | B1 | 2/2003 | DeFreitas | |
| 6,967,284 | B1 | 11/2005 | Gretz | |
| 7,473,005 | B2 * | 1/2009 | O'Brien | F21S 8/02 362/147 |
| 7,784,754 | B2 | 8/2010 | Nevers | |
| 7,857,275 | B2 | 12/2010 | de la Borbolla | |
| 7,950,832 | B2 | 5/2011 | Tanaka | |
| 8,235,549 | B2 | 8/2012 | Gingrich, III | |
| 8,322,897 | B2 | 12/2012 | Blincoe | |
| 8,408,759 | B1 * | 4/2013 | Rashidi | F21V 17/002 362/240 |
| 8,545,064 | B2 | 10/2013 | Blincoe | |
| 8,845,144 | B1 | 9/2014 | Davis | |
| 8,926,133 | B2 | 1/2015 | Booth | |
| 9,039,254 | B2 | 5/2015 | Danesh | |
| 9,151,457 | B2 | 10/2015 | Pickard | |
| 9,404,639 | B2 | 8/2016 | Bailey | |
| 9,523,493 | B2 | 12/2016 | Chen | |
| 9,605,842 | B1 | 3/2017 | Davis | |
| 9,673,597 | B2 | 6/2017 | Lee | |
| 9,696,021 | B2 | 7/2017 | Wronski | |
| 9,732,904 | B1 * | 8/2017 | Wronski | F21V 21/14 |
| 9,797,562 | B2 | 10/2017 | Dabiet | |
| 9,854,642 | B2 | 12/2017 | Kashani | |
| 9,890,942 | B2 | 2/2018 | Lin | |
| 9,945,548 | B2 | 4/2018 | Williams | |
| 9,964,266 | B2 | 5/2018 | Danesh | |
| 10,072,805 | B2 | 9/2018 | Bailey | |
| D832,218 | S | 10/2018 | Wronski | |
| D833,977 | S | 11/2018 | Danesh | |
| 10,139,059 | B2 | 11/2018 | Danesh | |
| 10,244,607 | B1 | 3/2019 | Kashani | |
| D847,414 | S | 4/2019 | Danesh | |
| D847,415 | S | 4/2019 | Danesh | |
| 10,247,390 | B1 | 4/2019 | Kopitzke | |
| D848,375 | S | 5/2019 | Danesh | |
| D851,046 | S | 6/2019 | Peng | |
| 10,378,738 | B1 | 8/2019 | Davis | |
| 10,408,395 | B2 | 9/2019 | Danesh | |
| 10,408,396 | B2 | 9/2019 | Wronski | |
| D864,877 | S | 10/2019 | Danesh | |
| 10,488,000 | B2 | 11/2019 | Danesh | |
| 10,551,044 | B2 | 2/2020 | Peng | |
| 10,563,850 | B2 | 2/2020 | Danesh | |
| D877,957 | S | 3/2020 | Kopitzke | |
| 10,591,120 | B2 | 3/2020 | Bailey | |
| 10,609,785 | B1 | 3/2020 | Fardadi | |
| 10,616,968 | B2 | 4/2020 | Wang | |
| 10,663,127 | B2 | 5/2020 | Danesh | |
| 10,663,153 | B2 | 5/2020 | Nikooyan | |
| 10,753,558 | B2 | 8/2020 | Danesh | |
| 10,805,997 | B2 | 10/2020 | Wang | |
| 10,816,148 | B2 | 10/2020 | Danesh | |
| D901,398 | S | 11/2020 | Danesh | |
| D902,871 | S | 11/2020 | Danesh | |
| D903,605 | S | 12/2020 | Danesh | |
| D905,327 | S | 12/2020 | Williams | |
| D907,284 | S | 1/2021 | Danesh | |
| 10,975,570 | B2 | 4/2021 | Shen | |
| 10,982,829 | B2 | 4/2021 | Danesh | |
| 10,989,390 | B2 | 4/2021 | Lotfi | |
| 11,022,259 | B2 | 6/2021 | Bailey | |
| 11,028,982 | B2 | 6/2021 | Danesh | |
| 11,047,538 | B2 | 6/2021 | Danesh | |
| D924,467 | S | 7/2021 | Danesh | |
| D925,109 | S | 7/2021 | Danesh | |
| 11,060,705 | B1 | 7/2021 | Danesh | |
| 11,067,231 | B2 * | 7/2021 | Lotfi | F21V 23/06 |
| 11,085,597 | B2 | 8/2021 | Danesh | |
| 11,118,768 | B2 | 9/2021 | Danesh | |
| 11,435,066 | B2 * | 9/2022 | Danesh | F21S 8/026 |
| 2008/0002414 | A1 * | 1/2008 | Miletich | F21V 19/04 362/382 |
| 2014/0254177 | A1 | 9/2014 | Danesh | |
| 2015/0009676 | A1 | 1/2015 | Danesh | |
| 2015/0233556 | A1 | 8/2015 | Danesh | |
| 2015/0276185 | A1 | 10/2015 | Bailey | |
| 2016/0312987 | A1 | 10/2016 | Danesh | |
| 2016/0348860 | A1 | 12/2016 | Bailey | |
| 2016/0348861 | A1 | 12/2016 | Bailey | |
| 2017/0005460 | A1 | 1/2017 | Lee | |
| 2017/0045213 | A1 | 2/2017 | Williams | |
| 2017/0138576 | A1 | 5/2017 | Peng | |
| 2017/0167672 | A1 | 6/2017 | Stauner | |
| 2017/0167699 | A1 | 6/2017 | Schubert | |
| 2017/0290129 | A1 | 10/2017 | Kashani | |
| 2018/0231197 | A1 | 8/2018 | Danesh | |
| 2018/0372284 | A1 | 12/2018 | Danesh | |
| 2019/0049080 | A1 | 2/2019 | Danesh | |
| 2019/0063701 | A1 | 2/2019 | Lotfi | |
| 2019/0093836 | A1 | 3/2019 | Danesh | |
| 2019/0394849 | A1 | 12/2019 | Wang | |
| 2020/0056752 | A1 | 2/2020 | Danesh | |
| 2020/0116340 | A1 | 4/2020 | Nikooyan | |
| 2020/0158302 | A1 | 5/2020 | Danesh | |
| 2020/0232624 | A1 | 7/2020 | Lotfi | |
| 2020/0236755 | A1 | 7/2020 | Wang | |
| 2020/0291652 | A1 | 9/2020 | Shen | |
| 2020/0348000 | A1 | 11/2020 | Bailey | |
| 2020/0386375 | A1 | 12/2020 | Danesh | |
| 2020/0393118 | A1 | 12/2020 | Danesh | |
| 2021/0010647 | A1 | 1/2021 | Danesh | |
| 2021/0010663 | A1 | 1/2021 | Nikooyan | |
| 2021/0033268 | A1 | 2/2021 | Danesh | |
| 2021/0041070 | A1 | 2/2021 | Danesh | |
| 2021/0071836 | A1 | 3/2021 | Danesh | |
| 2021/0080084 | A1 | 3/2021 | Danesh | |
| 2021/0262650 | A1 | 8/2021 | Danesh | |

FOREIGN PATENT DOCUMENTS

| | | | |
|---|---|---|---|
| WO | WO2018237294 | A2 | 12/2018 |
| WO | WO2018237294 | A3 | 12/2018 |
| WO | WO2019046310 | A1 | 3/2019 |
| WO | WO2019133669 | A1 | 7/2019 |
| WO | WO2019222259 | A1 | 11/2019 |

(56) References Cited

FOREIGN PATENT DOCUMENTS

WO WO2019241198 A1 12/2019
WO WO2021051101 A1 3/2021

OTHER PUBLICATIONS

US 10,969,069 B2, 04/2021, Danesh (withdrawn)
DMF DRD2 Product Publicly available at least as early as Sep. 6, 2018 Website: https://www.dmflighting.com/product/drd2/.
DMF DRD4 Product Publicly available at least as early as Sep. 6, 2018 Website: https://www.dmflighting.com/product/drd4/.
Elco E247 Product Publicly available at least as early as Sep. 6, 2018 See document with two product images of this Elco E247 Product.
Soraa LED Optical Light Engine See: https://res.cloudinary.com/soraa/image/upload/v1516986148/resources/misc/ole-more-info-pdf.pdf.
Imtra Tide PowerLED Light Fixture See: https://www.imtra.com/1806fa8d-4593-40f4-bbf0-f9a833e92148/lighting-light-fixtures-detail.htm Publicly available at least as early as 2012.
Elco 4" Round LED Reflector Insert Publicly available at least as early as Mar. 23, 2021 Website: https://elcolighting.com/products/4-round-led-reflector-insert.
Elco 4" Five-Color Temperature Switch LED Reflector Inserts Publicly available at least as early as Mar. 23, 2021 Website: https://elcolighting.com/node/1432026.
MaxLite Publicly available at least as early as Mar. 23, 2021 Website: https://www.maxlite.com/news-and-events/2021/02/05/maxlite-introduces-canless-commercial-downlights-with-field-selectable-wattages-and-ccts/ And https://www.maxlite.com/products/universal-downlights-wattage-color-selectable/.
Soraa Vivid MR16-GU10; https://www.soraa.com/products/19-MR16-GU10.php (last visited Nov. 9, 2021).
Nora Lighting, NIOB-2RNDC https://noralighting.com/product/niob-2rndc/.
Nora Lighting, NIO-4RPH https://noralighting.com/product/nio-4rph/.
Nora Lighting, NIOB-1RNG https://noralighting.com/product/niob-1rng/.
Nora Lighting https://noralighting.com/product-category/products/pendants/cylinder/.
Nora Lighting https://noralighting.com/product-category/products/pendants/ilene-mini-cylinder/.
Bruck Lighting https://brucklighting.com/download/b/GX15/Spec%20Sheets/GX15%20Cylinder%20Multi-Mount%20Spec%20Sheet.pdf.
Elite LED Lighting https://iuseelite.com/product-category/architectural-cylinders/?characteristics=c%2Bq.
DMF Lighting https://www.dmflighting.com/wp-content/uploads/2021/12/DMFLighting_DCC_Spec_Sheet.pdf.
Sunco Lighting 10 Pack 4 Inch Recessed Lighting Housing Can Light New Construction, Air Tight Steel Ceiling Can, 120-277V, Hard Wired, TP24 Connector, Easy Install, IC Rated, UL Listed https://www.amazon.com/Sunco-Lighting-Construction-Downlight-Electrician/dp/B01N4RT3CD/ref=sr_1_5?crid=27BW0MUZZE2JJ&keywords=ASIN+B01N4RT3CD&qid=1649455893&sprefix=asin+b01n4rt3cd%2Caps%2C119&sr=8-5 (last visited Apr. 8, 2022).
Halo E27ICAT E26 Series Recessed Lighting Shallow New Construction Insulation Contact Rated Air-Tite Housing, 6 In, Aluminum https://www.amazon.com/E27ICAT-Recessed-Lighting-Construction-Insulation/dp/B076C37RS3/ref=sr_1_1?crid=2CTRIHBHRV1KF&keywords=ASIN+B076C37RS3&qid=1649455212&sprefix=asin+b076c37rs3%2Caps%2C901&sr=8-1 (last visited Apr. 8, 2022).

* cited by examiner

RECESSED LIGHTING ASSEMBLY AND PORTIONS THEREOF

PRIORITY NOTICE

The present patent application is a continuation-in-part (CIP) of U.S. non-provisional patent application Ser. No. 17/068,618 filed on Nov. 27, 2020, and claims priority to said U.S. non-provisional patent application under 35 U.S.C. § 120. The above-identified patent application is incorporated herein by reference in its entirety as if fully set forth below.

The present patent application is a continuation-in-part (CIP) of U.S. non-provisional patent application Ser. No. 16/790,345 filed on Feb. 13, 2020, and claims priority to said U.S. non-provisional patent application under 35 U.S.C. § 120. The above-identified patent application is incorporated herein by reference in its entirety as if fully set forth below.

TECHNICAL FIELD OF THE INVENTION

The present invention relates in general to recessed lighting assemblies used in buildings and more specifically to recessed lighting assemblies with mounting-frames and with housing-cans.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Recessed lighting assemblies, for installation above a given ceiling, generally comprise a pair of hanger bars, a mounting frame, a housing can, a junction box, and some conduit. The pair of hanger bars are used to attach to adjacent ceiling joists. The mounting frame is attached to the pair of hanger bars. The housing can is attached to the mounting frame. The junction box is also attached to the mounting frame. And some conduit runs from the junction box to the housing can. The housing can will house some lighting electronics, such as, a light source.

Many prior art recessed lighting assemblies utilize separate/independent brackets (e.g., L-brackets) to attach a given housing can to a given mounting frame. It would be desirable if such separate/independent brackets were not necessary, such as but using a means to attach the given housing can directly to the mounting frame, i.e., if the mounting frame itself had a means to attach to the housing can.

Many prior art recessed lighting assemblies utilize only an aperture (hole), without a guiding skirt, in the mounting frame to receive the housing can and this allows an axial centerline of the housing can to be off from a desired orthogonal with respect to a major/main plane of the top of the mounting frame. It would be desirable if that aperture for the housing can in the mounting frame did have a guiding skirt, to help make sure the desired orthogonal orientation is maintained between the axial centerline of the housing can and the major/main plane of the top of the mounting frame.

FIG. 1A shows a prior art recessed lighting assembly 101 sold from Amazon branded Sunco Lighting, with an Amazon ASIN of B01N4RT3CD, has a mounting frame 103 with three mounting ears 105 arranged in an isosceles triangle configuration (when viewed from above or below). None of the cutouts 107 for these three mounting ears 105 points at a main corner 109 of this mounting frame 103. Note, a height of these three mounting ears 105 is at or below a top of the perimeter fence 111 of the mounting frame 103; i.e., the height of these three mounting ears 105 does not extend past the top of the perimeter fence 111 of the mounting frame 103. Each of the three mounting ears 105 has a single hole 113 for a fastener. With respect to a length of the mounting frame 103, the housing can 115 and the junction box 117 occupy overlapping halves of the mounting frame 103; i.e., the housing can 115 and the junction box 117 do not occupy different halves of the mounting frame 103. With respect to the length of the mounting frame 103, there is only one cutout 119 for the brackets 121 for the hanger bar 123 between the housing can 115 and the junction box 117.

It may be desirable to have fewer than three mounting ears (e.g., to save on materials of construction manufacturing times); and to thus, not utilize the isosceles triangle configuration of arranged mounting ears. It may be desirable to have longer mounting ears (e.g., to better grasp, guide, and/or position the housing can). Longer mounting ears may require longer mounting ears cutouts in the main/major plane of the mounting frame; and thus, to gain more room on main/major plane of the mounting frame for the mounting ears cutouts, it may be desirable to have one mounting ear cutout point to one of the main corners of the mounting frame, such that the two mounting ears cutouts lie on a straight/linear diagonal line with respect to that one main corner that a mounting ear cutout is pointing at. Longer mounting ears will also be taller than the perimeter fence of the mounting frame. It may be desirable if the mounting ears have more than just the single hole for receiving a fastener.

FIG. 1B to FIG. 1D shows a prior art recessed lighting assembly 151 sold from Amazon branded HALO, with an Amazon ASIN of B076C37RS3. This mounting frame 153 also has three mounting ears 155, also arranged in a triangular configuration, when viewed from above or below. This triangular configuration of mounting ears 155 is more of an equilateral triangle configuration. Again, each mounting ear 155 has only one single hole for a fastener. Again, none of the cutouts 157 for these mounting ears 155 on this mounting frame 153 are pointing at a main corner 159 of this mounting frame 153. Two opposing main corners 159 do have other cutouts 161 for adjusting the hanger bars 163, but these other cutouts 161 are not for nor associated with the mounting ears 155. And the remaining two opposing main corners 159 have raised surfaces 171 proximate/adjacent that would block any cutout for mounting ears. The mounting ears 155 are still short, reaching less than half of the height of the housing can 169. In prior art recessed lighting assembly 151 the junction box 165 is fixed at a totally different height as compared to the main/major plane of the mounting frame 153, where the mounting ears 155 cutouts 157 and the other cutouts 161 are located. The junction box 165 is positioned over/above one of the hanger bars 163. The hanger bars 163 can only be attached to two opposing of the four perimeter fence 167 sides of the mounting frame 153, one of which is a side of perimeter fence 167 that is below one of the hanger bars 163. There are never any cutouts nor brackets for the hanger bars 163 located between the junction box 165 and the housing can 169.

It may be desirable to have fewer than three mounting ears (e.g., to save on materials of construction manufacturing times); and to thus, not utilize the (equilateral) triangle configuration of arranged mounting ears. It may be desirable to have longer mounting ears (e.g., to better grasp, guide, and/or position the housing can). Longer mounting ears may require longer cutouts in the main/major plane of the mounting frame; and thus, to gain more room on main/major plane of the mounting frame for the cutouts for the mounting ears, it may be desirable to have one mounting ear cutout point to one of the main corners of the mounting frame, such that two mounting ear cutouts lie on a straight/linear diagonal line with respect to that one main corner that a mounting ear cutout is pointing at. Longer mounting ears may reach a half or more of the height of the housing can. It may be desirable if the mounting ears have more than just the single hole for receiving a fastener. It may be desirable of the hangers bars could be attached to any side of the mounting frame and not just two opposing sides.

There is a need in the art for a mounting frame and a recessed lighting assembly that includes such a mounting frame that has at least some of the above noted desirable structures, qualities, and/or attributes.

It is to these ends that the present invention has been developed.

BRIEF SUMMARY OF THE INVENTION

To minimize the limitations in the prior art, and to minimize other limitations that will be apparent upon reading and understanding the present specification, some embodiments of the present invention may describe a mounting-frame that is configured for use in a recessed lighting assembly. Some embodiments, may contemplate the entire recessed lighting assembly and not just the mounting-frame.

In some embodiments, the mounting-frame may comprise a main-planar-member, an aperture-for-housing-can, two mounting-ears, and a skirt. In some embodiments, the main-planar-member may be at least mostly flat and planar, aside from some extensions (such as, but not limited to, the two mounting-ears, the skirt, and a perimeter-fence). In some embodiments, the aperture-for-housing-can may be a hole within the main-planar-member that may be configured to receive at least a portion of a housing-can. In some embodiments, the housing-can may be configured to house at least one light source (and/or lighting electronics, such as, but limited to, a driver and heat sink). In some embodiments, the two mounting-ears may extend orthogonally above the main-planar-member and may extend from opposing sides of the aperture-for-housing-can. In some embodiments, the two mounting-ears may be configured for attaching to the housing-can. In some embodiments, the skirt may extend from the main-planar-member, at the aperture-for-housing-can, in an opposite direction from the mounting-ears. In some embodiments, the skirt may be configured to act as a guide to facilitate proper placement, positioning, and/or alignment of the housing-can with respect to the mounting-frame. In some embodiments, the skirt may be configured to act as a guide/template for cutting a corresponding and complementary sized and shaped hole within ceiling material (such as, but not limited to, drywall/sheetrock). In some embodiments, the two mounting-ears and the skirt may be formed from material of the main-planar-member such that the two mounting-ears, the skirt, and the main-planar-member are all integral with each other being of the same article of manufacture.

It is an objective of the present invention to provide a recessed lighting assembly and/or portions thereof.

It is another objective of the present invention to provide a recessed lighting assembly comprising at least a mounting-frame and a housing-can.

It is another objective of the present invention to provide a recessed lighting assembly comprising a mounting-frame, a housing-can, and hanger-bars.

It is another objective of the present invention to provide a recessed lighting assembly comprising a mounting-frame, a housing-can, hanger-bars, and a junction-box.

It is another objective of the present invention to provide a recessed lighting assembly comprising a mounting-frame, a housing-can, hanger-bars, a junction-box, and some conduit.

It is another objective of the present invention to provide a mounting-frame that is configured for use in a recessed lighting assembly.

It is another objective of the present invention to provide a mounting-frame that is configured for use with a housing-can.

It is another objective of the present invention to provide a mounting-frame that is configured for use with hanger-bars.

It is another objective of the present invention to provide a mounting-frame that is configured for use with a housing-can, hanger-bars, and a junction-box.

It is another objective of the present invention to provide a mounting-frame that has structure(s) (e.g., mounting-ear(s)) for mounting to a housing-can.

It is another objective of the present invention to provide a mounting-frame with mounting-ear(s) that are configured for mounting to a housing-can.

It is another objective of the present invention to provide a mounting-frame with mounting-ear(s) that are configured for mounting to a housing-can; wherein the mounting-frame and the mounting-ear(s) are integral with other, being of a single article of manufacture.

It is another objective of the present invention to provide a mounting-frame with a (guiding) skirt that is configured to guide a housing-can into position with respect to the mounting-frame.

It is another objective of the present invention to provide a mounting-frame with a (guiding) skirt that is configured to guide a housing-can into position with respect to the mounting-frame; wherein the mounting-frame and the skirt are integral with other, being of a single article of manufacture.

It is another objective of the present invention to provide a mounting-frame with one (1) or two (2) mounting-ear(s) that are configured for mounting to a housing-can.

It is another objective of the present invention to provide a mounting-frame with only two (2) mounting-ears that are configured for mounting to a housing-can.

It is another objective of the present invention to provide mounting-ear(s) that are longer than prior art mounting ears of prior art mounting frames.

It is another objective of the present invention to provide mounting-ear(s) that are not shorter than half of the height of the housing-can, when the housing-can is attached to the mounting-ear(s).

It is another objective of the present invention to provide mounting-ear(s) that are long enough to reach half or more of the height of the housing-can, when the housing-can is attached to the mounting-ear(s).

It is another objective of the present invention to provide mounting-ear(s) that are longer than a perimeter-fence of the mounting-frame.

It is another objective of the present invention to provide a mounting-ear cutout that points at a main corner of the mounting-frame.

It is another objective of the present invention to provide a mounting-ear cutout that points at a main corner of the mounting-frame and that is adjacent/proximate to that main corner.

It is another objective of the present invention to provide two (2) different/separate mounting-ears (and corresponding mounting-ear cutouts) that are arranged in a linear/straight diagonal line with respect to one main corner of the mounting-frame, with one of those two mounting-ears cutouts pointing at that main corner.

It is another objective of the present invention to provide at least two holes (apertures) in the mounting-ears, wherein each such hole (aperture) is configured for receiving at least a portion of a fastener.

It is another objective of the present invention to provide a mounting-frame wherein any perimeter-fence side is configured for (removable) attachment to a hanger-bar.

It is another objective of the present invention to provide hanger bars attachable to any side of the mounting-frame's perimeter-fence.

It is another objective of the present invention to provide a junction-box attached to the mounting-frame on a same level as the main/major plane of the mounting-frame.

It is another objective of the present invention to provide a junction-box that is not raised above a main/major plane of the mounting-frame, when the junction-box is attached to the mounting-frame.

It is another objective of the present invention to provide a junction-box attached to the mounting-frame, such that the junction-box is not above nor below a hanger-bar.

It is another objective of the present invention to provide a recessed lighting assembly such that the hanger-bars are positioned to the outside of the junction-box.

It is another objective of the present invention to provide a recessed lighting assembly such that the junction-box and the housing-can occupy different halves of the mounting-frame, with respect to a length of the mounting-frame.

It is another objective of the present invention to provide a recessed lighting assembly such that the junction-box and the housing-can do not share any portion of the same halves of the mounting-frame, with respect to a length of the mounting-frame.

It is another objective of the present invention to provide a junction-box and housing-can that are spaced apart from each other on the mounting-frame by a fixed, finite, and predetermined distance.

It is yet another objective of the present invention to provide a junction-box and housing-can that are spaced apart from each other on the mounting-frame by a fixed, finite, and predetermined distance, such at least two (2) adjacent cutouts for hanger-bar brackets is between the junction-box and the housing-can.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

REFERENCE NUMERAL SCHEDULE

Figure 1A:
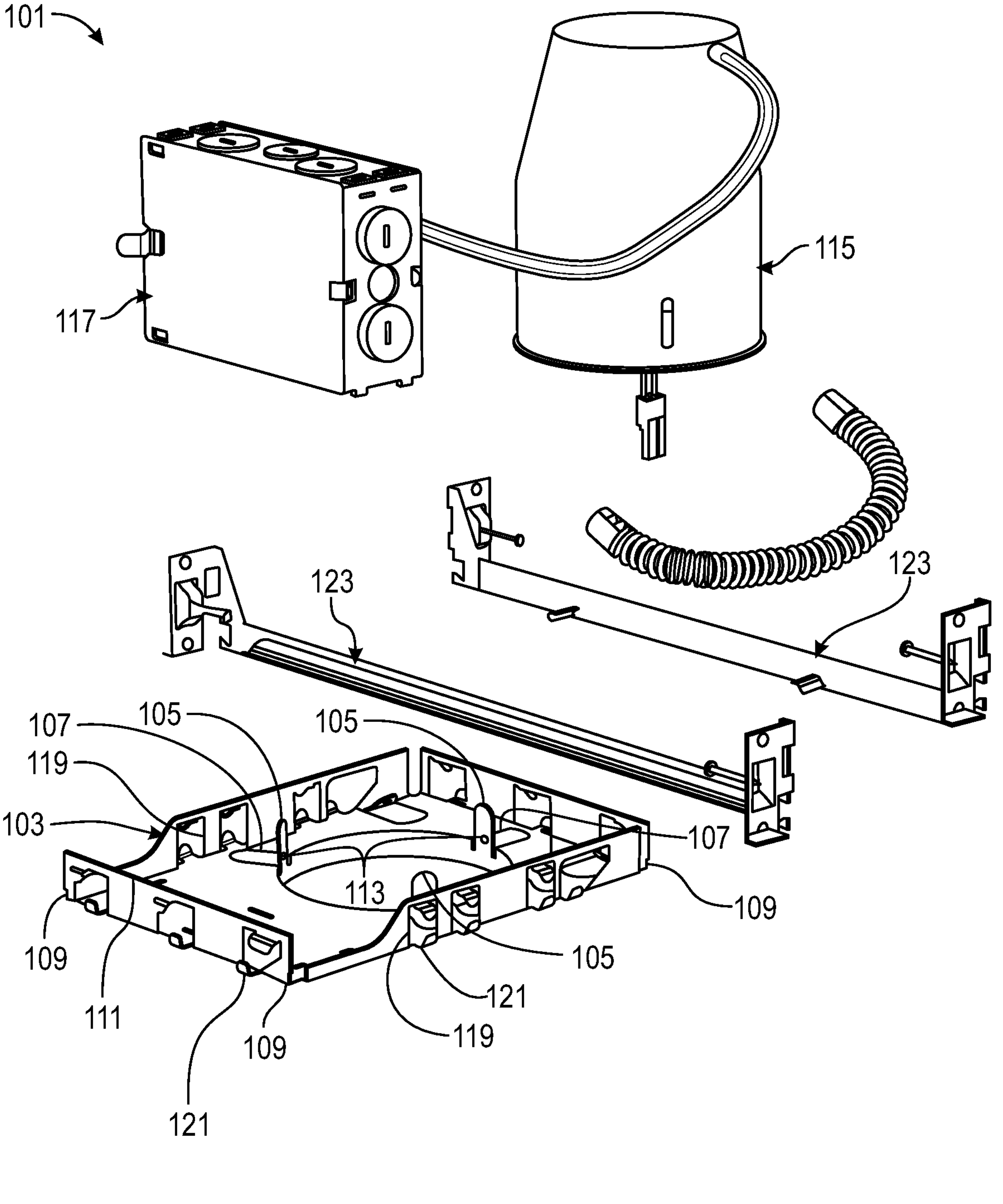
FIG. 1A (Prior Art)
FIG. 1A depicts a prior art recessed lighting assembly.
Figure 1B:
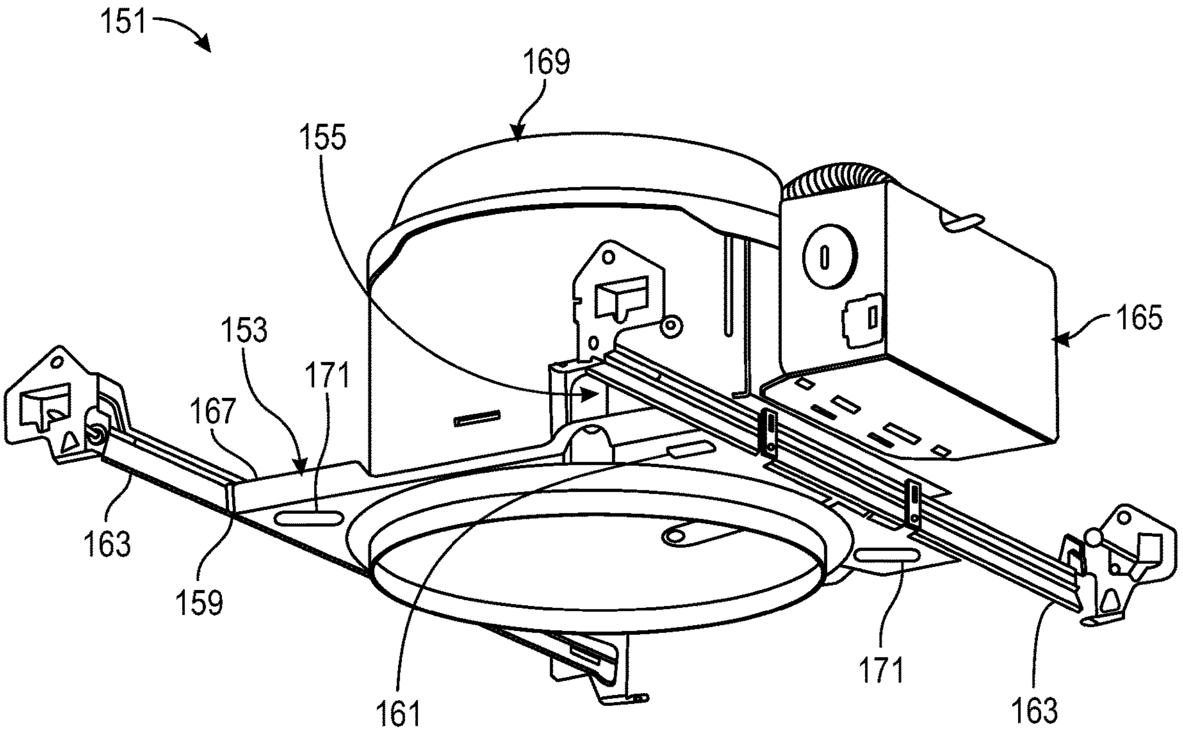
FIG. 1B (Prior Art)
FIG. 1B depicts another/different prior art recessed lighting assembly.
Figure 1C:
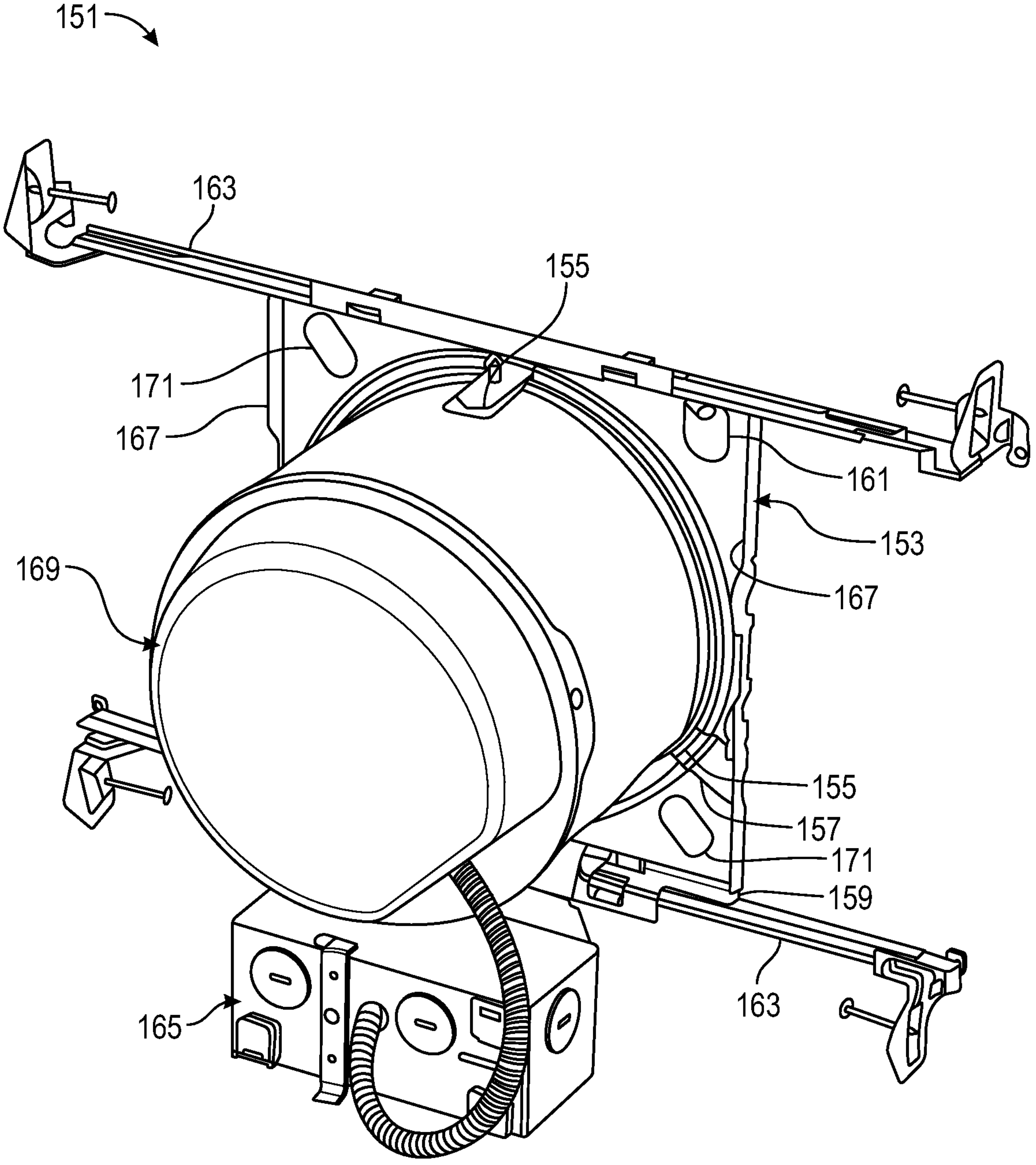
FIG. 1C (Prior Art)
FIG. 1C depicts the prior art recessed lighting assembly of FIG. 1B, but from a different viewing angle.
Figure 1D:
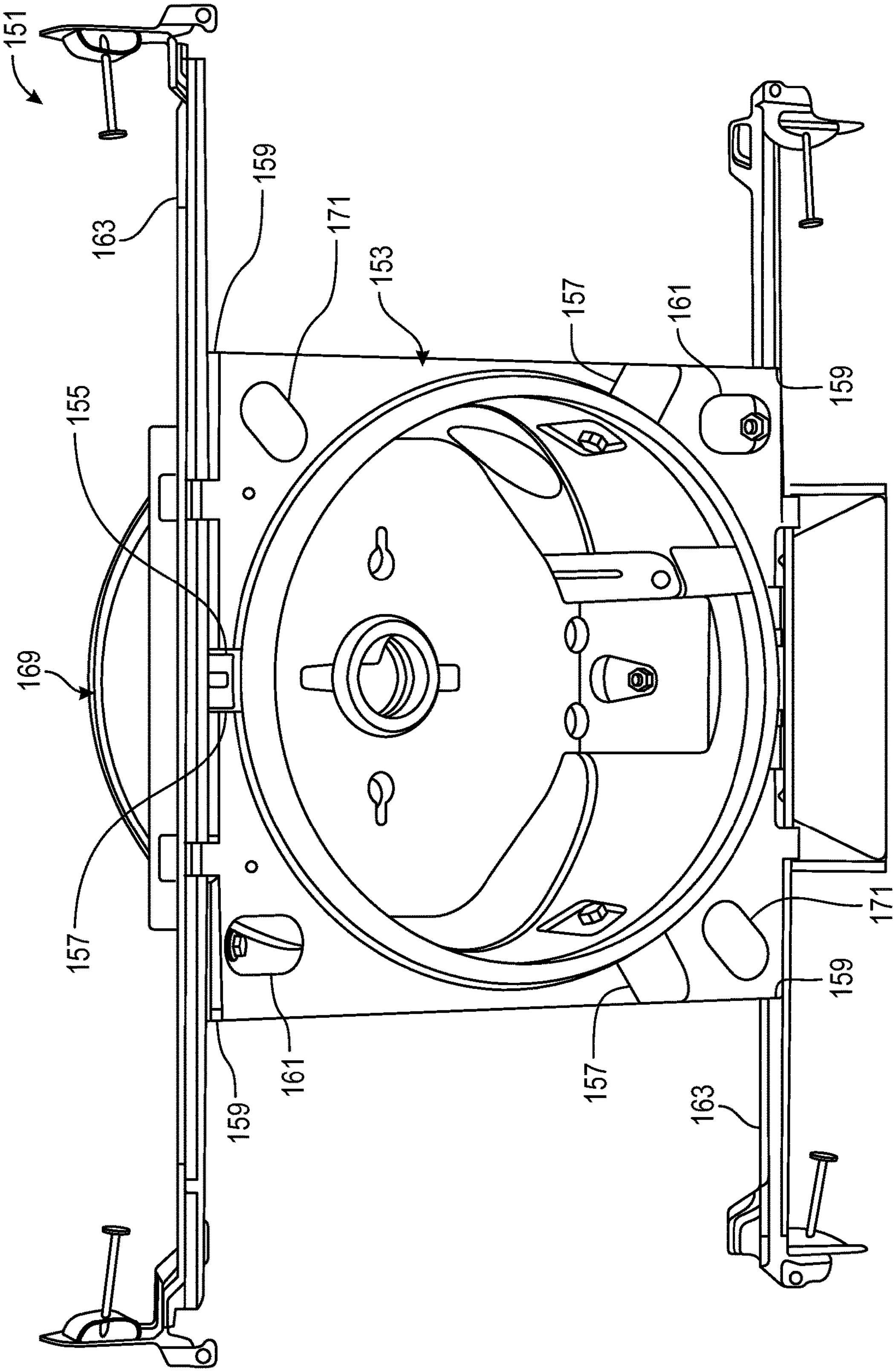
FIG. 1D (Prior Art)
FIG. 1D depicts the prior art recessed lighting assembly of FIG. 1B, but from a different viewing angle.

101 prior art recessed lighting assembly 101
103 mounting frame 103
105 mounting ears 105

107 cutouts 107
109 main corner 109
111 perimeter fence 111
113 single hole 113
115 housing can 115
117 junction box 117
119 cutout 119
121 brackets 121
123 hanger bar 123
151 prior art recessed lighting assembly 151
153 mounting frame 153
155 mounting ears 155
157 cutouts 157
159 main corner 159
161 other cutouts 161
163 hanger bars 163
165 junction box 165
167 perimeter fence 167
169 housing can 169
171 raised surface 171
200 recessed-lighting-assembly 200
201 mounting-frame 201
211 hanger-bar 211
221 housing-can 221
225 fastener 225
226 fastener 226
231 junction-box 231
241 conduit 241
301 main-planar-member 301
303 top 303 (top-surface 303)
305 aperture-for-housing-can 305
307 mounting-ear 307
309 aperture-in-mounting-ear 309
311 height-of-mounting-ear 311
313 cutout-for-mounting-ear 313
315 corner-nearest-mounting-ear 315 (corner 315)
317 corner 317
319 corner-away-from-housing-can 319 (corner 319)
321 slot-for-mounting 321
322 slot 322
323 perimeter-fence 323
325 height-of-perimeter-fence 325
327 bracket-for-hanger-bar 327
329 cutout 329
331 notch 331
333 bottom 333 (bottom-surface 333)
335 skirt 335 (collar 335)
337 height-of-skirt 337
339 diameter 339
341 length 341
343 width 343
401 sidewall 401
403 aperture-for-mounting 403
404 mounting-height-marker 405
407 lid 407
409 top 409
411 connection-for-ground 411
413 aperture-for-knockout 413
415 knockout-cover 415
417 marking 417
419 bottom 419
421 notch 421
423 notch 423
425 tab 425
427 inside-surface-of-lid 427
429 diameter 429
431 height 431

DETAILED DESCRIPTION OF THE INVENTION

"Substantially" as used herein, unless otherwise noted, may mean that the relationship(s) being discussed need not be (geometrically/dimensionally) perfect, i.e., a 5% deviation may be contemplated/considered. For example, and without limiting the scope of the present invention, if two elements may be substantially parallel (or perpendicular or orthogonal) to each other, those two elements need not be perfectly parallel (nor perfectly perpendicular nor perfectly orthogonal) to each other, but may be plus or minus 5% of such perfect parallel (or perpendicular or orthogonal) quality/property. For example, and without limiting the scope of the present invention, if an element may be substantially flat (or planar or solid or rigid or rectangular or round or circular), that given element need not be perfectly flat (or planar or solid or rigid or rectangular or round or circular), but may be plus or minus 5% of such perfect flat (or planar or solid or rigid or rectangular or round or circular) quality/property.

Note, the following U.S. patents are incorporated in their entireties as if fully set forth herein: D927430, D922331, D902160, U.S. Pat. No. 10,876,721, D892069, and U.S. Pat. No. 10,295,163.

Note, the following two (2) published U.S. patent application Ser. Nos. 17/068,618 and 16/790,345 are incorporated in their entireties as if fully set forth herein.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

Note, FIG. 1A to FIG. 1D depicts prior art and are discussed above in the Background of the Invention section.

Figure 2A:
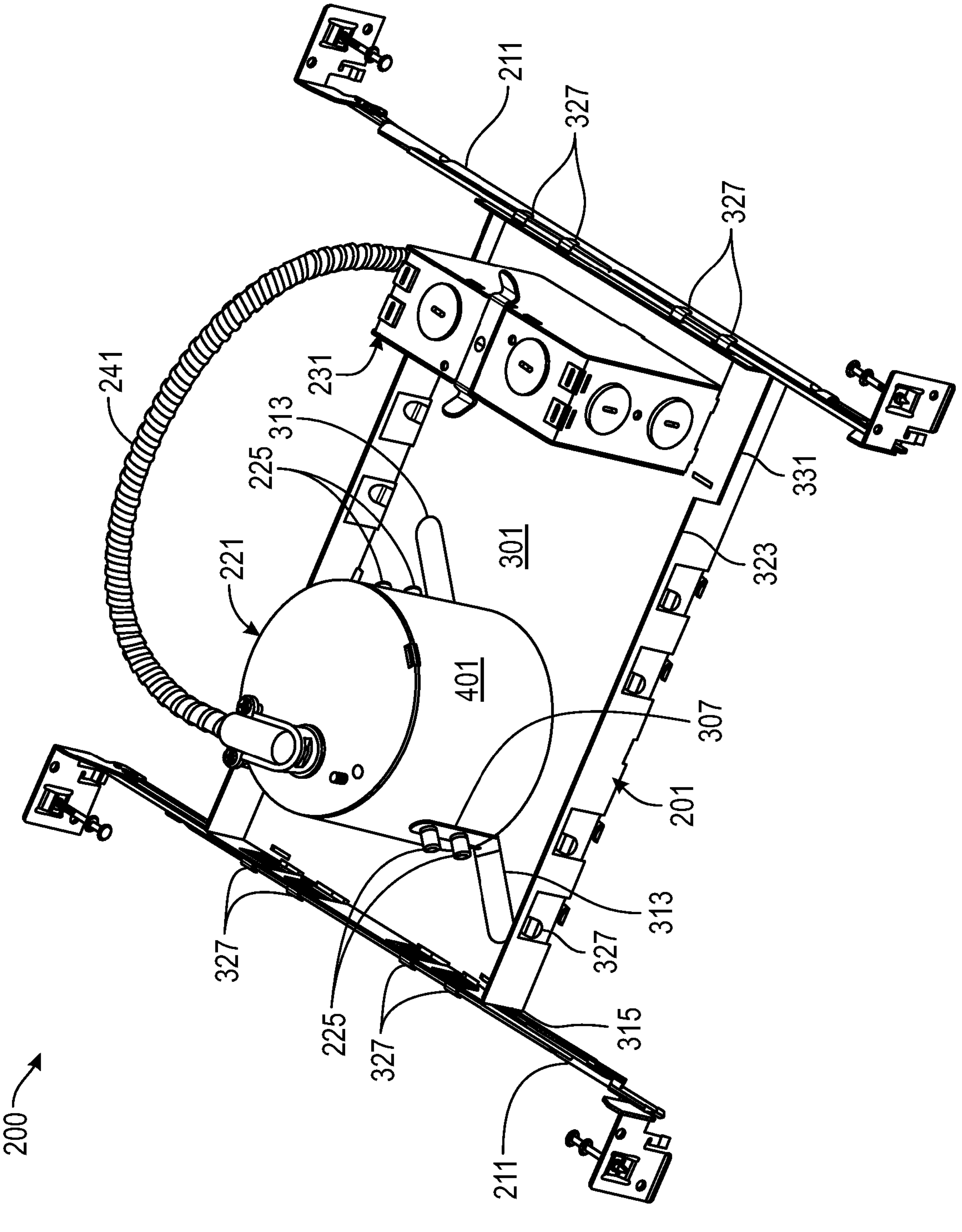
FIG. 2A is a top perspective view of a recessed-lighting-assembly according to at least one embodiment of the present invention.

FIG. 2A is a top perspective view of recessed-lighting-assembly 200 according to at least one embodiment of the present invention. In some embodiments, recessed-lighting-assembly 200 may comprise mounting-frame 201 and housing-can 221. In some embodiments, recessed-lighting-assembly 200 may comprise mounting-frame 201, hanger-bar 211, and housing-can 221. In some embodiments, recessed-lighting-assembly 200 may comprise mounting-frame 201, hanger-bar 211, housing-can 221, and junction-box 231. In some embodiments, recessed-lighting-assembly 200 may comprise mounting-frame 201, hanger-bar 211, housing-can 221, junction-box 231, and conduit(s) 241. In some embodiments, recessed-lighting-assembly 200 may comprise mounting-frame 201, hanger-bar 211, housing-can 221, fastener(s) (such as, but not limited to, fastener(s) 225 and/or fastener(s) 226), junction-box 231, and conduit 241.

In some embodiments, recessed-lighting-assembly 200 may also/further comprise at least some electronics, such as, but not limited to, at least one light source (e.g., a light emitting diode [LED]; an incandescent light source; a fluorescent light source; a CFL (compact fluorescent light) source; a halogen light source; a neon light source; a sodium light source; a predetermined light source; at least a portion of an electronic circuit that emits light; portions thereof; combinations thereof; and/or the like); a driver; a chip; a circuit; a printed circuit board (PCB); wiring/cabling; portions thereof; combinations thereof; and/or the like.

Continuing discussing FIG. 2A, in some embodiments, mounting-frame 201 may be shown by itself in FIG. 3A to FIG. 3H. Note, 3XX series reference numerals are with respect to mounting-frame 201. In some embodiments, mounting-frame 201 may be configured to function as a structural support/foundational member for hanger-bar(s) 211, housing-can 221, junction-box 231 to (removably) attach to. In some embodiment, in use/application mounting-frame 201 may generally be installed above a ceiling (e.g., of drywall/sheet rock and/or some other ceiling sheeting material) and in between ceiling joists.

Continuing discussing FIG. 2A, in some embodiments, hanger-bar 211 may be configured to function as a structural linkage member between mounting-frame 201 and an adjacent pair of ceiling joists (ceiling trusses, ledger board(s), and/or the like of the given building). In some embodiments, recessed-lighting-assembly 200 may comprise two (2) different hanger-bars 211. In some embodiments, two different, but at least substantially parallel sides of mounting-frame 201 may each have one (1) hanger-bar 211 attached thereto (by way of brackets-for-hanger-bar 327 of mounting-frame 201). In some embodiments, a given hanger-bar 211 may be configured to extend/retract in a sliding telescoping manner a predetermined distance along the length of the given hanger-bar 211, to account for different distances between adjacent joists (and the like). In some embodiments, opposing terminal ends of a given hanger-bar 211 may terminate in bracket structures that may be configured to be mounted to a given joist, e.g., via a fastener, like a nail, screw, or the like. In some embodiments, a given hanger-bar 211 may be at least substantially (mostly) made from a rigid to semi-rigid material, such as, but not limited to, a metal or a metal alloy. In some embodiments, hanger-bar 211 may be attached to any exterior side of mounting-frame 201. In some embodiments, hanger-bars 211 are not attached to mounting-frame 201 in such a way that junction-box 231 is located above or below the hanger-bar(s) 211.

Continuing discussing FIG. 2A, in some embodiments, housing-can 221 may be shown by itself in FIG. 4A to FIG. 4H. Note, 4XX series reference numerals are with respect to housing-can 221. In some embodiments, housing-can 221 may be configured to house at least one light source. In some embodiments, housing-can 221 may be configured to house at least some electronics typical of a recessed (down) lighting assembly, such as, but not limited to: at least one light source (e.g., a light emitting diode [LED]; an incandescent light source; a fluorescent light source; a CFL (compact fluorescent light) source; a halogen light source; a neon light source; a sodium light source; a predetermined light source; at least a portion of an electronic circuit that emits light; portions thereof; combinations thereof; and/or the like); a driver; a chip; a circuit; a printed circuit board (PCB); wiring/cabling; portions thereof; combinations thereof; and/or the like. In some embodiments, housing-can 221 may be configured to house at least a portion of a heat sink, a lens, an optical reflector, a trim, portions thereof, combinations thereof, and/or the like.

Continuing discussing FIG. 2A, in some embodiments, a bottom portion of housing-can 221 may be fitted into and inserted into an aperture-for-housing-can 305 and a skirt 335 of mounting-frame 201. Note, aperture-for-housing-can 305 is better seen in FIG. 3A. Note, skirt 335 is better seen in FIG. 3B. In some embodiments, skirt 335 may help to guide the bottom portion of housing-can 221 into place with respect to mounting-frame 201, such that an axial centerline of housing-can 221 may be at least substantially orthogonal with a main/major planar surface (e.g., main-planar-member 301) of mounting-frame 201. Without skirt 335, the axial centerline of housing-can 221 may be off from the desired orthogonal configuration with respect to main-planar-member 301.

Continuing discussing FIG. 2A, in some embodiments, housing-can 221 is (removably) attached to mounting-frame 201. In some embodiments, attachment of housing-can 221 to mounting-frame 201 may be accomplished by fastener(s) 225 and/or fastener(s) 226 securing mounting-ear(s) 307 of mounting-frame 201 to aperture(s)-for-mounting 403 of housing-can 221. Note, separate independent mounting brackets are not used to attach housing-can 221 to mounting-frame 201, as the mounting-ear(s) 307 are integral (same article of manufacture) with mounting-frame 201. Note, aperture(s)-for-mounting 403 are better shown in FIG. 4A.

Continuing discussing FIG. 2A, in some embodiments, fastener(s) 225 and/or fastener(s) 226 may be configured to (removably) attach mounting-ear(s) 307 of mounting-frame 201 to aperture(s)-for-mounting 403 of housing-can 221. In some embodiments, fastener 225 may be a mechanical fastener, such as, but not limited to, a bolt, a screw, a pin, a dowel, a rod, a rivet, a nut, a wingnut, a thumb nut, a thumb screw, a thumb bolt, portions thereof, combinations thereof, and/or the like. In some embodiments, fastener 225 may be visible on an exterior of recessed-lighting-assembly 200 and/or of housing-can 221. In some embodiments, a quantity of fastener(s) 225 and/or 226 may match a quantity of mounting-ear(s) 307 (of mounting-frame 201). In some embodiments, a quantity of fastener(s) 225 and/or 226 may match a quantity of aperture(s)-in-mounting-ear 309 (of mounting-frame 201). In some embodiments, a quantity of fastener(s) 225 and/or 226 may match a quantity of aperture(s)-for-mounting 403 (of housing-can 221). In some embodiments, recessed-lighting-assembly 200 may comprise only two (2) or only four (4) fasteners 225. In some embodiments, fastener 226 may be visible on an interior/inside of housing-can 221. Note, see FIG. 2B and/or FIG. 2D for fastener(s) 226.

Continuing discussing FIG. 2A, in some embodiments, junction-box 231 may be configured to function as a standard electrical junction-box used in lighting applications, such as, but not limited to, recessed lighting applications in buildings. In some embodiments, junction-box 231 may comprise electrical wiring/cabling, electrical connections, circuits, electronics, portions thereof, combinations thereof, and/or the like. In some embodiments, junction-box 231 may be on top of top 303 of mounting-frame 201. In some embodiments, junction-box 231 may be attached to top 303 of mounting-frame 201 via slot(s)-for-mounting 321 of mounting-frame 201.

Continuing discussing FIG. 2A, in some embodiments, conduit 241 may be configured to protect wiring/cabling that run between electronics of junction-box 231 to electronics of housing-can 221. In some embodiments, conduit 241 may function as electrical conduit. In some embodiments, conduit 241 may run from junction-box 231 to housing-can 221. In some embodiments, conduit 241 may be flexible and of a fixed and finite predetermined length. In some embodiments, opposing terminal ends of conduit 241 may be attached to junction-box 231 and to housing-can 221, respectively.

Figure 2B:
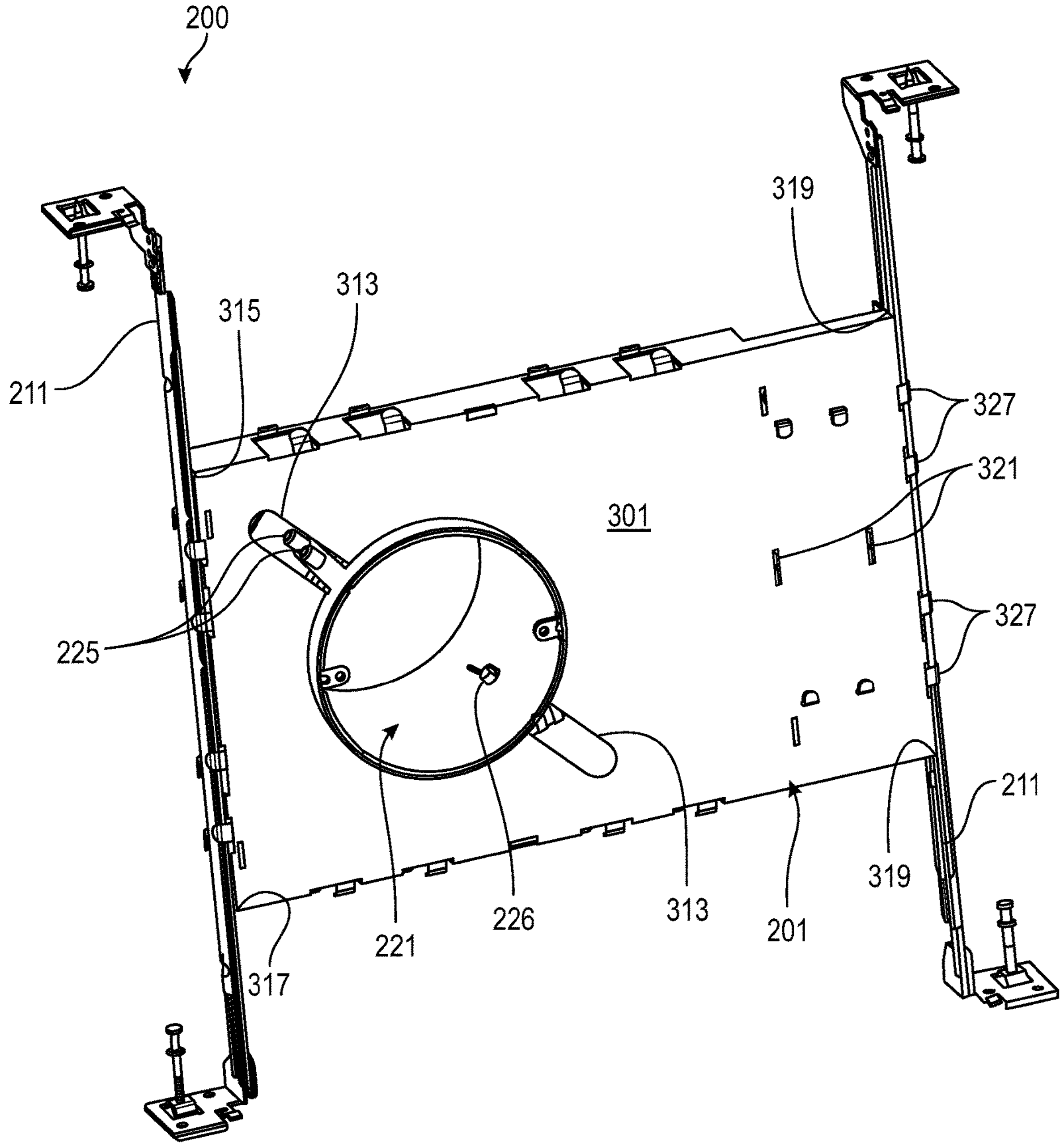
FIG. 2B is a bottom perspective view of the recessed-lighting-assembly of FIG. 2A.

FIG. 2B is a bottom perspective view of recessed-lighting-assembly 200.

In some embodiments, when housing-can 221 may be attached to mounting-ears 307 of mounting-frame 201, then bottom 419 (of housing-can 221) and a bottom of skirt 335 (of mounting-frame 201) may be about flush with each other, plus or minus five (5) percent of a given measurement unit (e.g., inches or millimeters [mm]).

In some embodiments, when hanger-bars 211 may be (removably) attached to mounting-frame 201, those hanger-bars 211 may be attached to the exterior of perimeter-fence 323 of mounting-frame 201 (e.g., via bracket(s)-for-hanger-bar 327 of mounting-frame 201).

In some embodiments, fastener 226 may be a mechanical fastener, such as, but not limited to, a bolt, a screw, a pin, a dowel, a rod, a rivet, a nut, a wingnut, a thumb nut, a thumb screw, a thumb bolt, portions thereof, combinations thereof, and/or the like. In some embodiments, fastener 226 may be complementary to fastener 225. For example, and without limiting the scope of the present invention, if fastener 225 may be a bolt/screw, then fastener 226 may be a nut, such as, but not limited to a wingnut, that may thread onto the threads of fastener 225. In some embodiments, a quantity of fastener(s) 226 may match a quantity of mounting-ear(s) 307 (of mounting-frame 201). In some embodiments, a quantity of fastener(s) 226 may match a quantity of aperture(s)-in-mounting-ear 309 (of mounting-frame 201). In some embodiments, a quantity of fastener(s) 226 may match a quantity of aperture(s)-for-mounting 403 (of housing-can 221). In some embodiments, a quantity of fastener(s) 226 may match a quantity of fastener(s) 225. In some embodiments, a quantity of fastener(s) 226 may match a half a quantity of fastener(s) 225. In some embodiments, recessed-lighting-assembly 200 may comprise only two (2) or only four (4) fasteners 226.

Figure 2C:
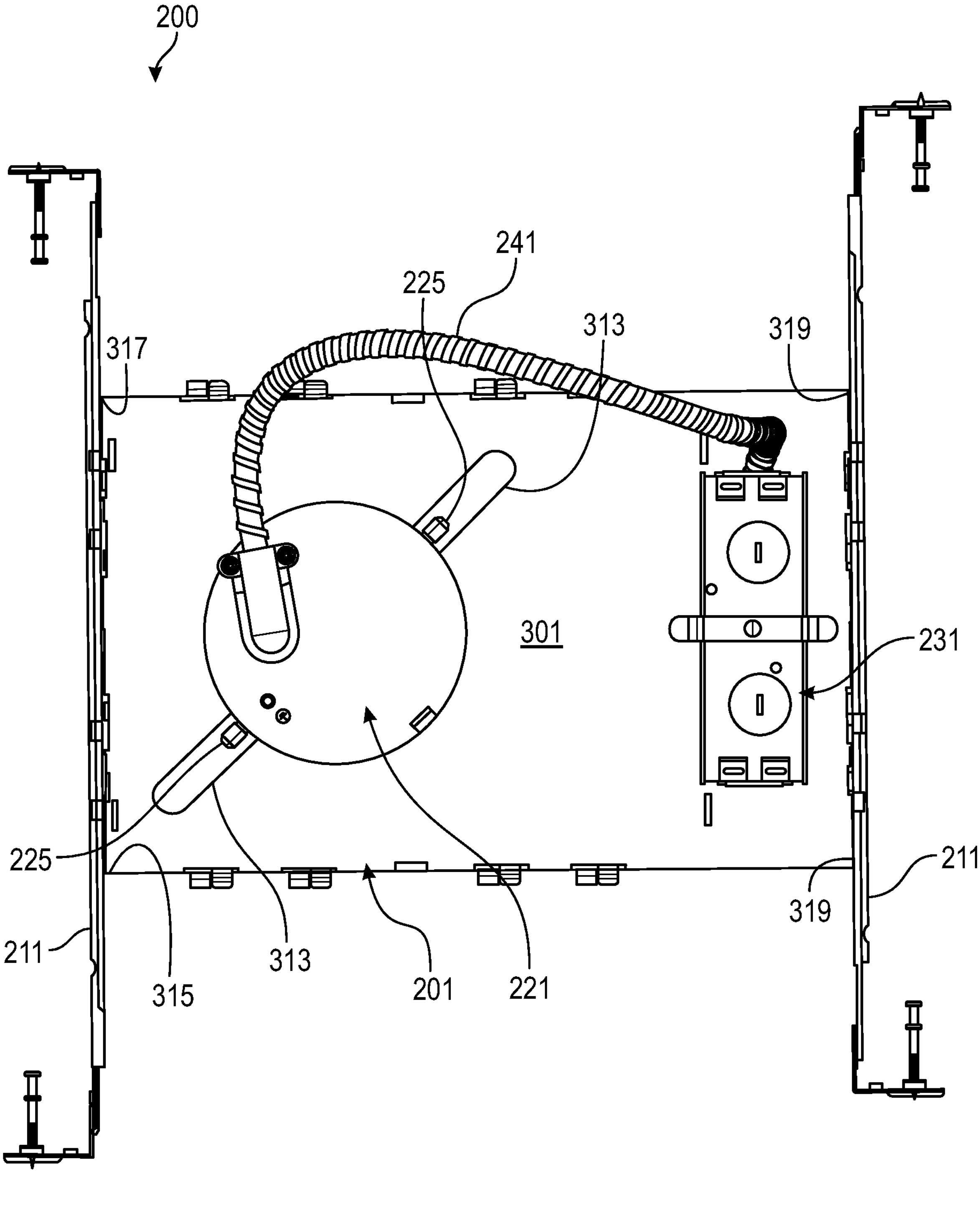
FIG. 2C is a top view of the recessed-lighting-assembly of FIG. 2A.

FIG. 2C is a top view of recessed-lighting-assembly 200.

In some embodiments, with respect to a length 341 of mounting-frame 201, housing-can 221 and junction-box 231 may occupy different halves of mounting-frame 201.

In some embodiments, with respect to a length 341 of mounting-frame 201, junction-box 231 may occupy a half of mounting-frame 201 that includes corners 319, but that does not include corner 315 nor corner 317.

Figure 2D:
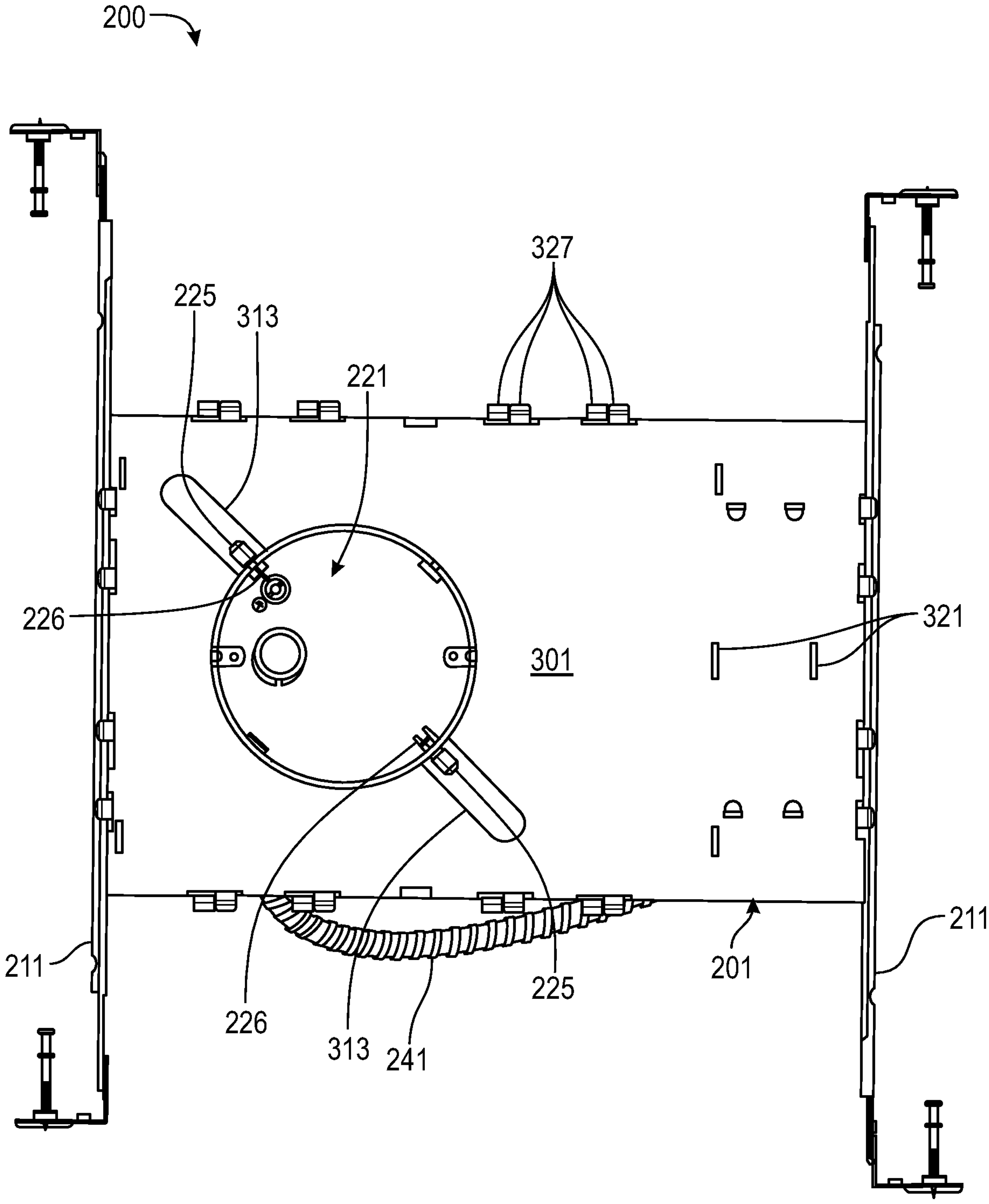
FIG. 2D is a bottom view of the recessed-lighting-assembly of FIG. 2A.

FIG. 2D is a bottom view of recessed-lighting-assembly 200.

In some embodiments, with respect to a length 341 of mounting-frame 201, housing-can 221, aperture-for-housing-can 305, and/or skirt 335 may occupy a half of mounting-frame 201 that includes corner 315 and corner 317, but that does not include corners 319.

Figure 2E:
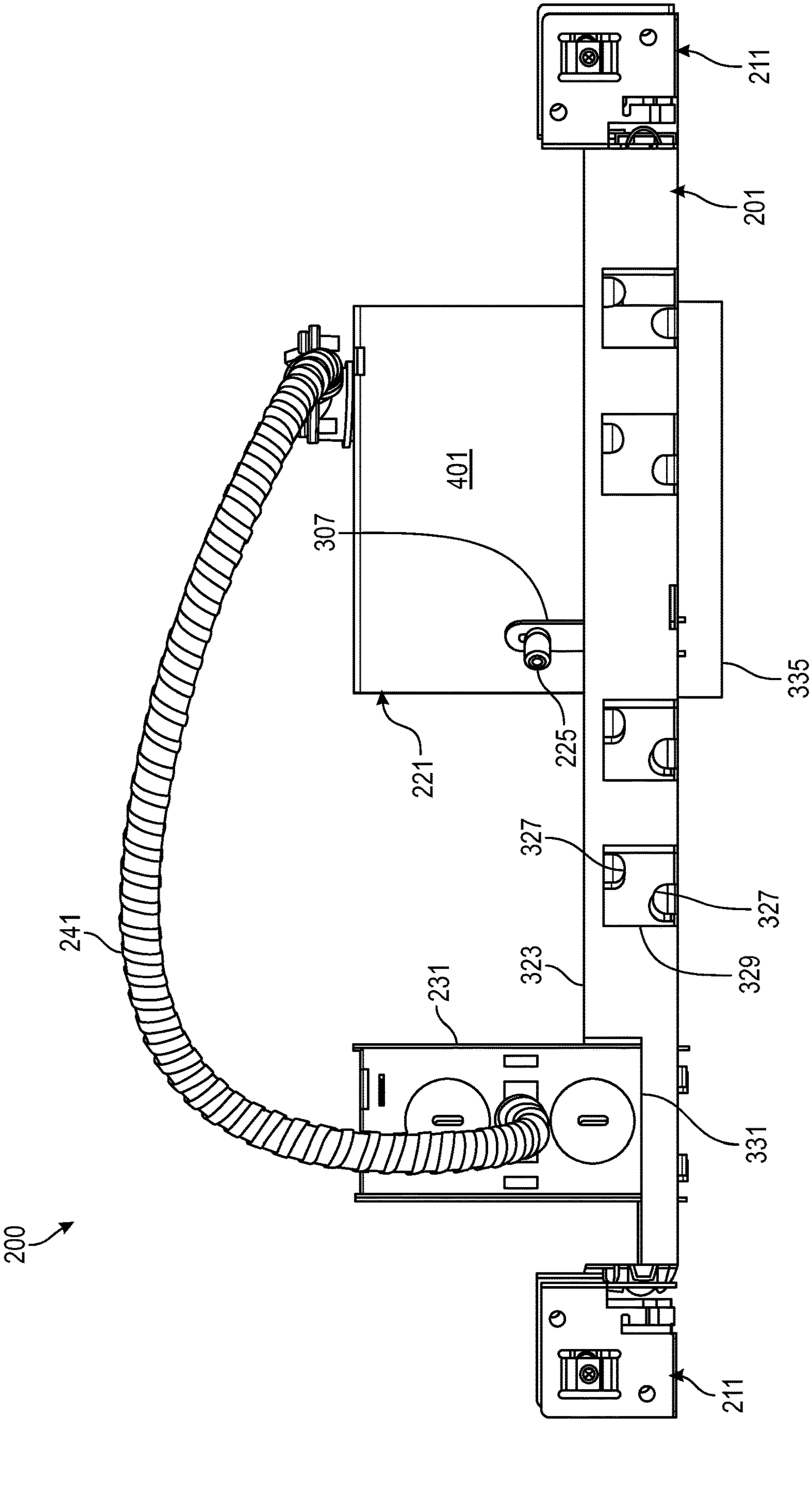
FIG. 2E is a front view of the recessed-lighting-assembly of FIG. 2A.

FIG. 2E is a front view of recessed-lighting-assembly 200.

In some embodiments, when housing-can 221 may be attached to mounting-ears 307 of mounting-frame 201, then top 409 (of housing-can 221) may be located above main-planar-member 301 (of mounting-frame 201) and bottom 419 (of housing-can 221) may be located below main-planar-member 301. In some embodiments, when housing-can 221 may be attached to mounting-ears 307 of mounting-frame 201, then main-planar-member 301 may be disposed between top 409 and bottom 419. In some embodiments, when housing-can 221 may be attached to mounting-ears 307 of mounting-frame 201, then main-planar-member 301 may be disposed between top 409 and bottom 419; with bottom 419 being located closer to main-planar-member 301 and with top 409 being located further away from main-planar-member 301 as compared to bottom 419. In some embodiments, when housing-can 221 may be attached to mounting-ears 307 of mounting-frame 201, mounting-ears 307 may extend over 50% of a side of housing-can 221 in a direction of height 431 of housing-can 221. In some embodiments, when housing-can 221 may be attached to mounting-ears 307 of mounting-frame 201, height-of-mounting-ear 311 (of mounting-ears 307) may reach up to 50% to 60% (including either endpoint of that range) of height 431 of housing-can 221.

Figure 3A:
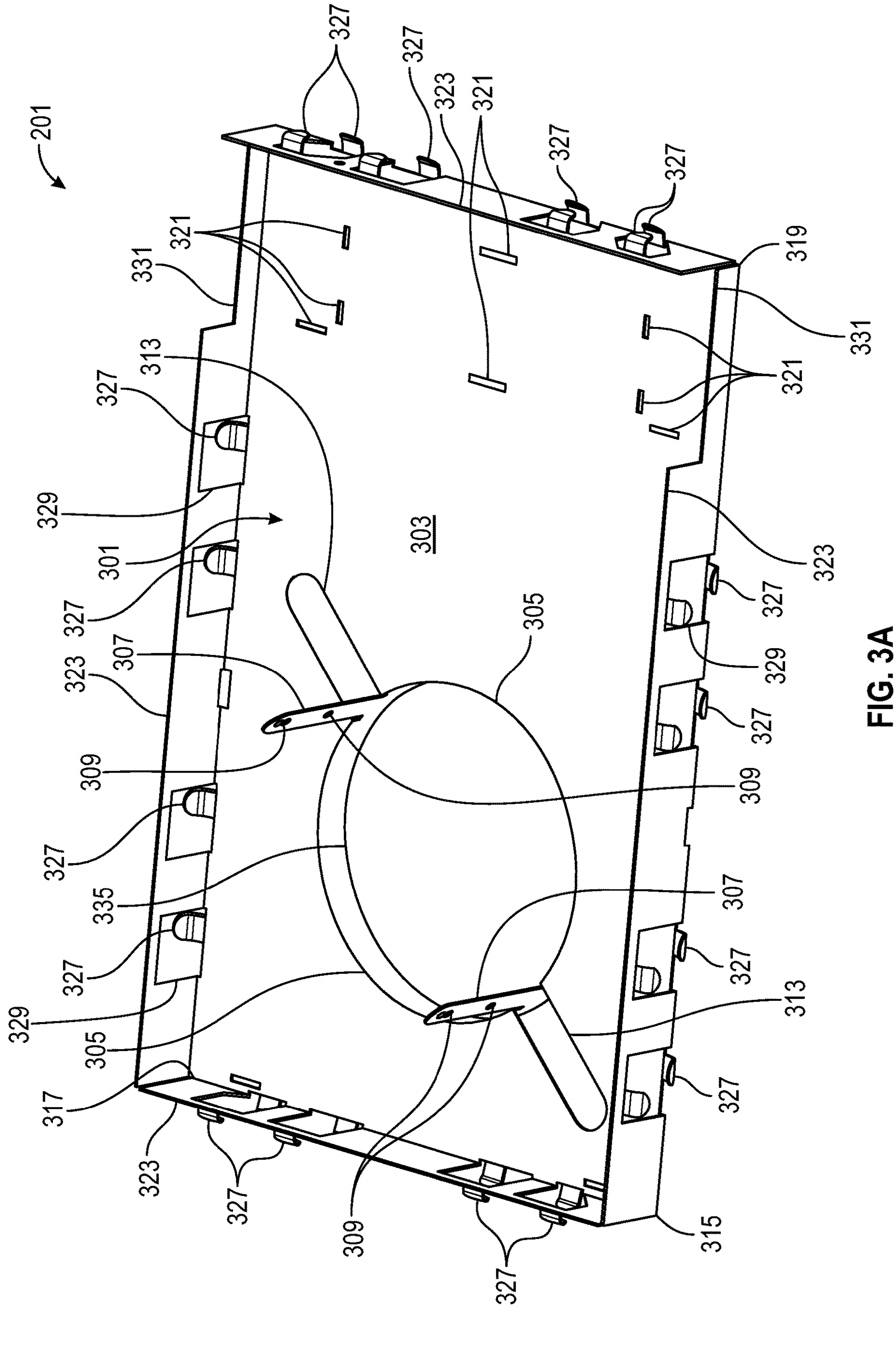
FIG. 3A is a top perspective view of just a mounting-frame (shown without other parts/components of the recessed-lighting-assembly of FIG. 2A).
Figure 3B:
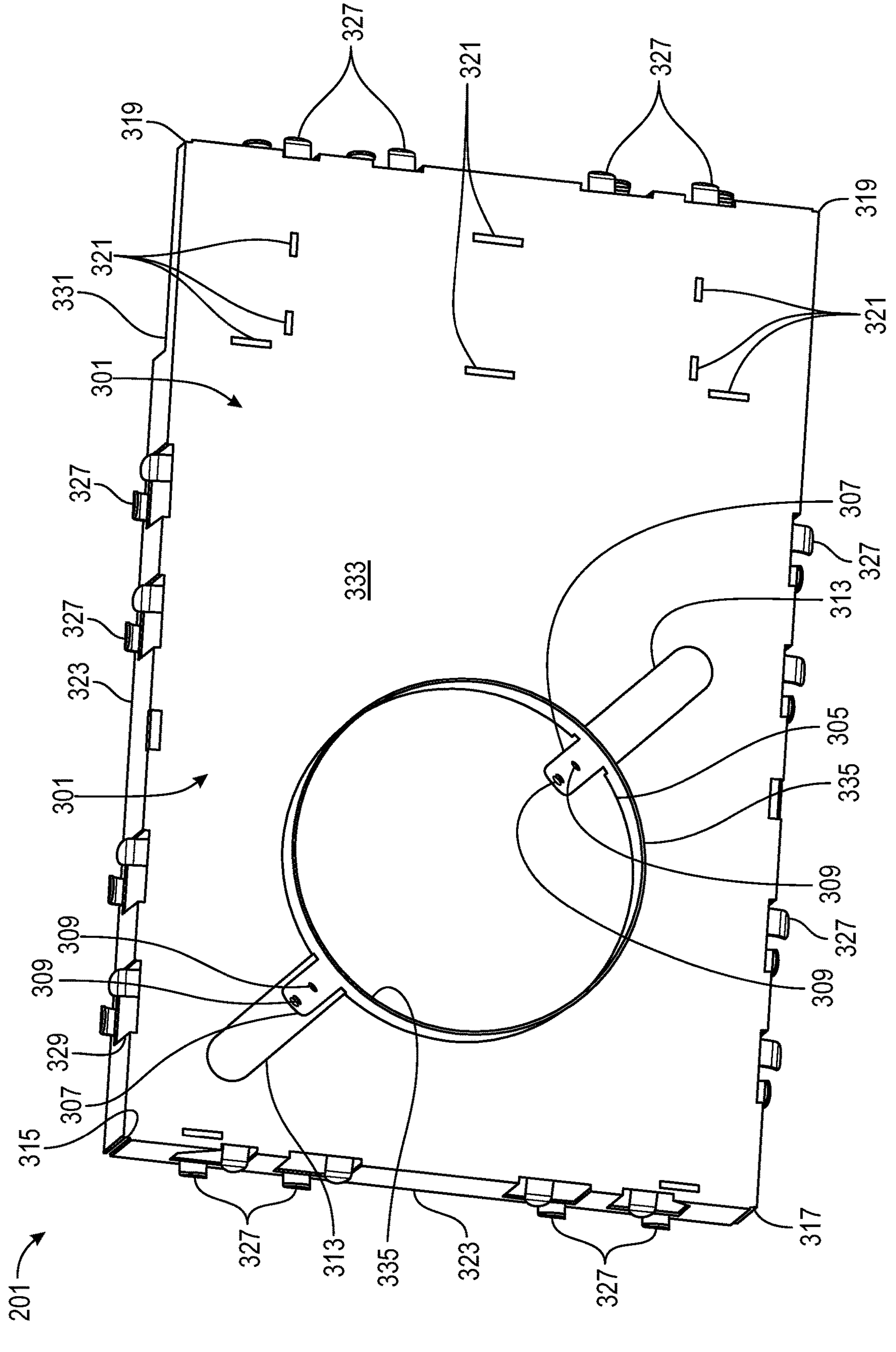
FIG. 3B is a bottom perspective view of just the mounting-frame of FIG. 3A.
Figure 3C:
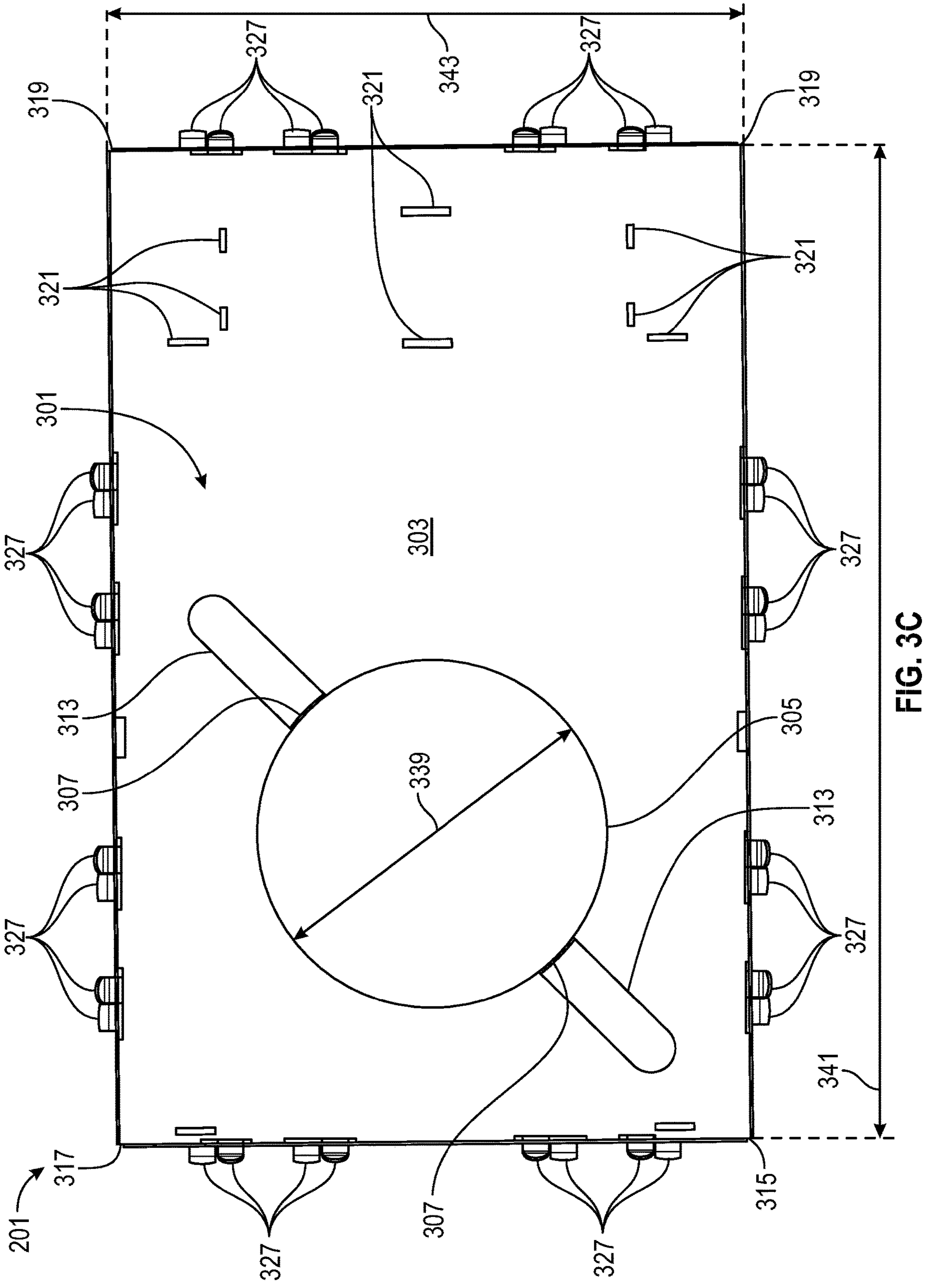
FIG. 3C is a top view of just the mounting-frame of FIG. 3A.

Continuing discussing FIG. 2E, in some embodiments, main-planar-member 301 (of mounting-frame 201) may comprise structures (such as, but not limited to, slot(s)-for-mounting 321 [see e.g., FIG. 3C for slot(s)-for-mounting 321]) for attaching to junction-box 231. In some embodiments, when junction-box 231 may be attached to main-planar-member 301 (of mounting-frame 201) via these structures for attaching to the junction-box 231, the junction-box 231 may rest on top of a top-surface 303 of the main-planar-member 301 such that a bottom of the junction-box 231 and the top-surface 303 are at a same level of height. That is, junction-box 231 is not attached in assembly 200 such that there is a gap between junction-box 231 and top-surface 303. Junction-box 231 is not mounted above top-surface 303 with a gap between junction-box 231 and top-surface 303.

Figure 2F:
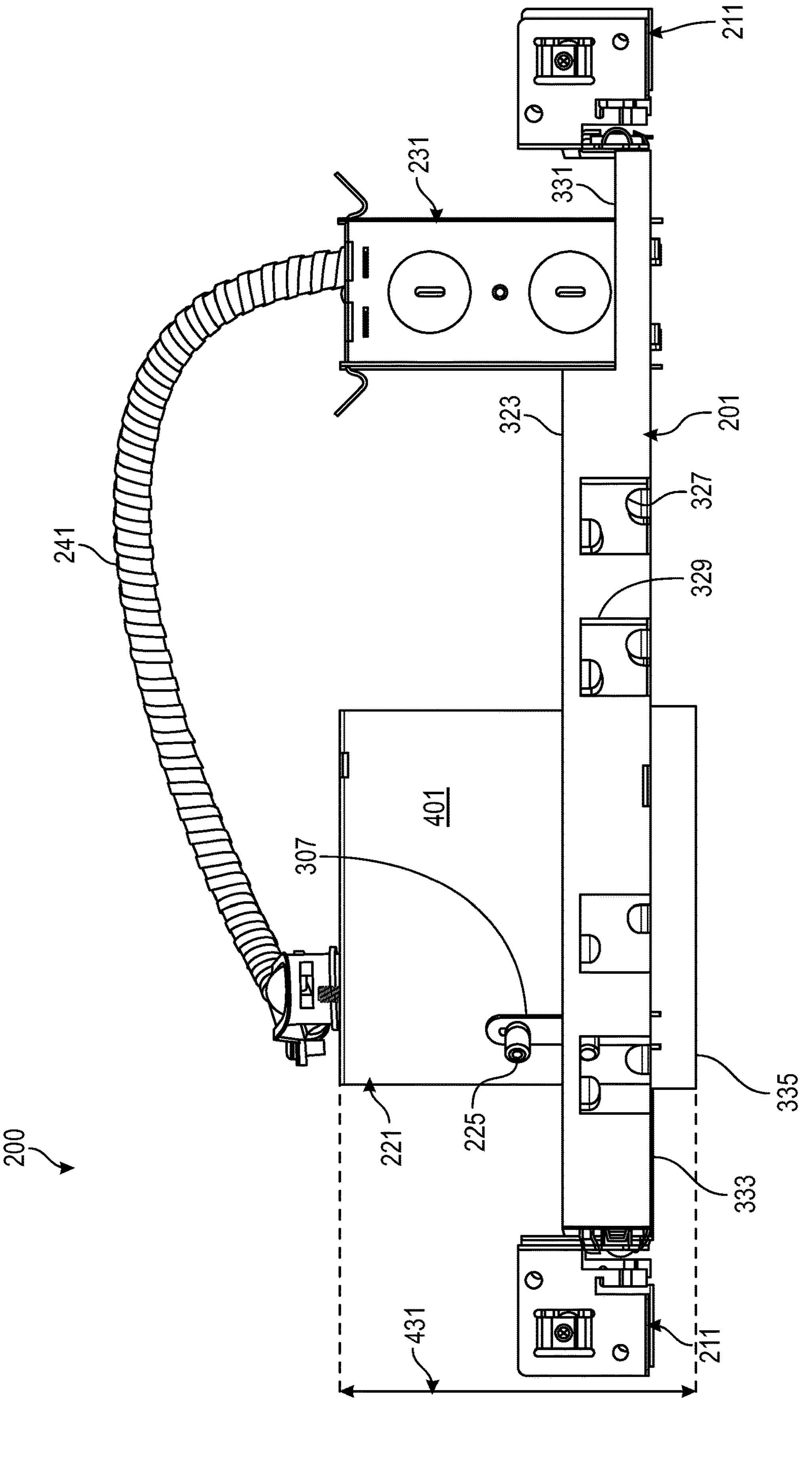
FIG. 2F is a rear (back) view of the recessed-lighting-assembly of FIG. 2A.

FIG. 2F is a rear (back) view of recessed-lighting-assembly 200. In some embodiments, FIG. 2F and FIG. 2E may be opposing views from each other. In some embodiments, with respect to length of mounting-frame 201, junction-box 231 may be located on mounting-frame 201 where at/along at least a portion of notch 331 of mounting-frame 201.

In FIG. 2F, with respect to length 341 of mounting-frame 201, housing-can 221 and junction-box 231 may appear side by side on mounting-frame 201, but spaced apart from each other by a fixed, finite, and predetermined distance. In some embodiments, with respect to length 341 of mounting-frame 201, housing-can 221 and junction-box 231 may appear side by side on mounting-frame 201 spaced apart from each other by at least two adjacent cutouts 329 of mounting-frame 201. In some embodiments, mounting-frame 201 may be configured for attachment to junction-box 231. In some embodiments, when housing-can 221 and junction-box 231 are attached to mounting-frame 201, then housing-can 221 and junction-box 231 are separated from each other by a finite, fixed, and predetermined distance. In some embodiments, the finite, fixed, and predetermined distance may be at least as long as two adjacent cutouts 329 with brackets-for-hanger-bars 327 on perimeter-fence 323 of mounting-frame 201. This separation between housing-can 221 and junction-box 231 (on mounting-frame 201) may permit some heat generating circuitry to be separated (e.g., some in housing-can 221 and some in junction-box 231), such that electronics (e.g., LED light chip and/or driver) within housing-can 221 may have more room/space, wherein that additional room/space may be allow for better heat transfer, which in turn may prolong the useful light of the lighting electronics.

Continuing discussing FIG. 2F, in some embodiments, when the housing-can 221 may be attached to the mounting-ears 307, a height 311 of mounting-ears 307 may extend along a sidewall 401 of housing-can 221 to half or more of a height 431 of the housing-can 221. See also FIG. 2E.

Figure 2G:
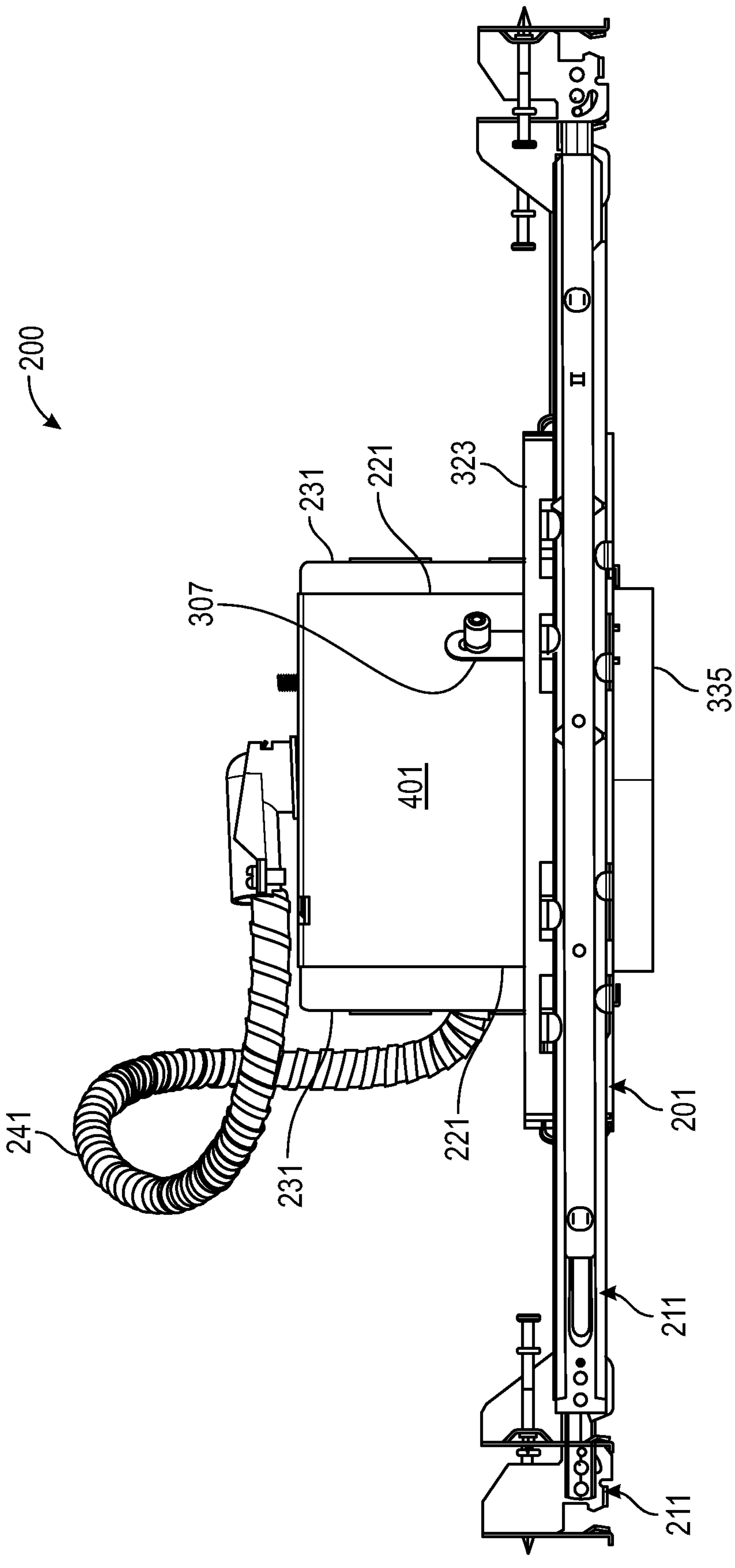
FIG. 2G is a left-side view of the recessed-lighting-assembly of FIG. 2A.

FIG. 2G is a left-side view of recessed-lighting-assembly 200. In FIG. 2G, junction-box 231 may appear behind housing-can 221.

Figure 2H:
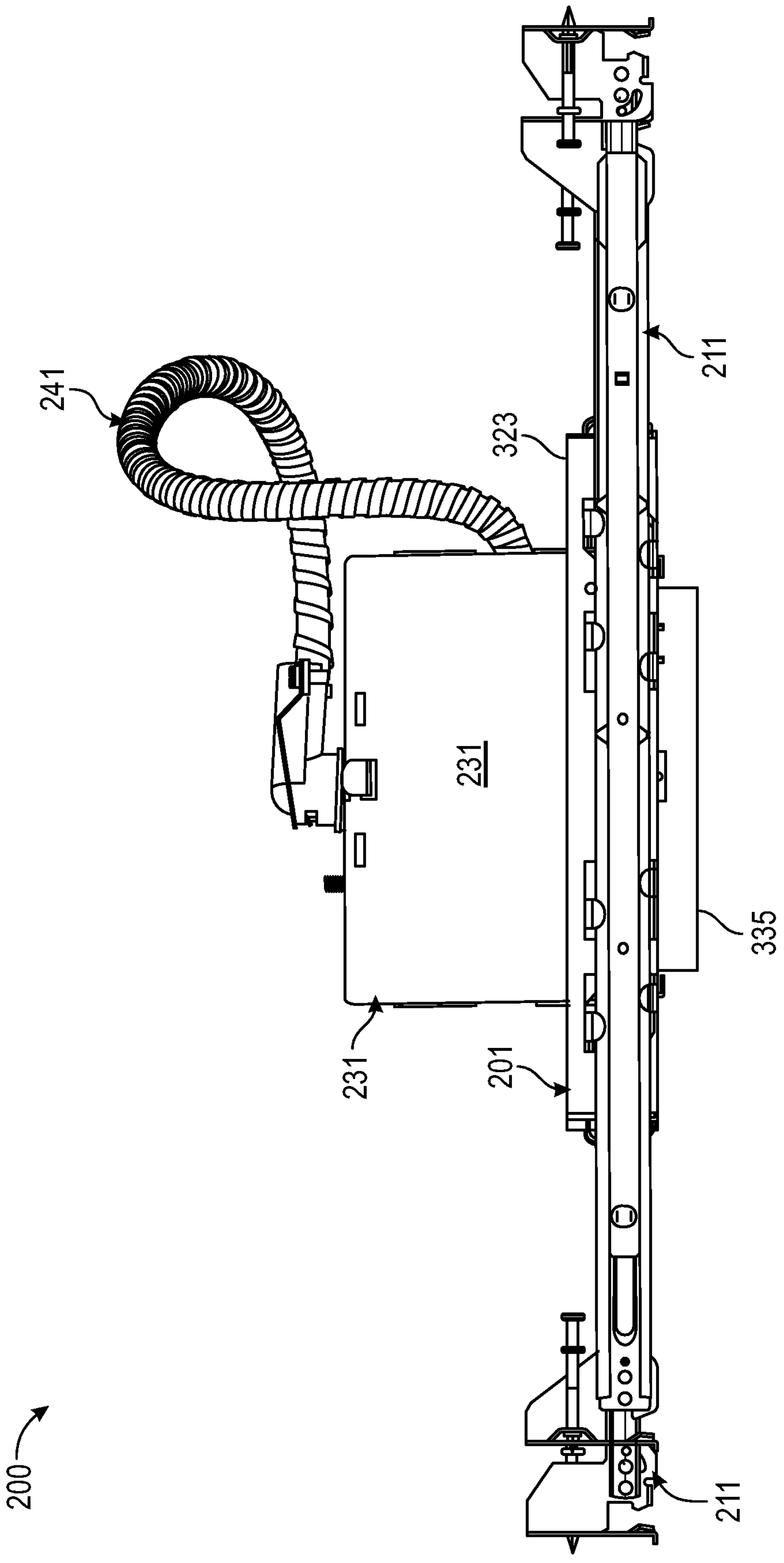
FIG. 2H is a right-side view of the recessed-lighting-assembly of FIG. 2A.

FIG. 2H is a right-side view of recessed-lighting-assembly 200. In some embodiments, FIG. 2G and FIG. 2H may be opposing views from each other. In FIG. 2H, junction-box 231 (and skirt 335) may be blocking visibility of at least most of housing-can 221.

In some embodiments, recessed-lighting-assembly 200 may comprise at least one of: mounting-frame 201, hanger-bar 211, housing-can 221, fastener 225, fastener 226, junction-box 231, conduit 241, portions thereof, combinations thereof, and/or the like. In some embodiments, recessed-lighting-assembly 200 may comprise one or more of: mounting-frame 201, hanger-bar 211, housing-can 221, fastener 225, fastener 226, junction-box 231, conduit 241, portions thereof, combinations thereof, and/or the like. In some embodiments, recessed-lighting-assembly 200 may comprise: mounting-frame 201, two hanger-bars 211, housing-can 221, fasteners 225, fasteners 226, junction-box 231, conduit 241, portions thereof, combinations thereof, and/or the like.

FIG. 3A is a top perspective view of just mounting-frame 201 (shown without other parts/components of recessed-lighting-assembly 200) according to at least one embodiment of the present invention. In some embodiments, mounting-frame 201 may be configured for use in a recessed lighting assembly, such as, but not limited to, recessed-lighting-assembly 200. In some embodiments, mounting-frame 201 may be part of a recessed lighting assembly, such as, but not limited to, recessed-lighting-assembly 200. In some embodiments, mounting-frame 201 may be formed (e.g., cut, bent, stamped, and/or shaped) from an at least substantially (mostly) planar sheet of metal, such as, but not limited to, steel.

Continuing discussing FIG. 3A, in some embodiments, mounting-frame 201, may comprise a main-planar-member 301. In some embodiments, a main/major plane of main-planar-member 301 may be at least substantially (mostly) parallel with a main/major plane of a ceiling where mounting-frame 201 may be installed. In some embodiments, where the main/major plane of the ceiling where mounting-frame 201 may be installed is at least substantially (mostly) flat and horizontal (with respect to the floor/ground), then the main/major plane of main-planar-member 301 may be at least substantially (mostly) horizontal as well. In some embodiments, main-planar-member 301 may be at least substantially (mostly) flat and planar along top-surface 303 and along a bottom-surface 333 (aside from various extensions/projections of material on main-planar-member 301, such as, but not limited to, mounting-ear(s) 307, perimeter-fence 323, skirt 335, and/or the like). In some embodiments, top-surface 303 may be disposed opposite from the bottom-surface 333 and separated from bottom-surface 333 by a thickness of main-planar-member 301. In some embodiments, main-planar-member 301 may be at least substantially (mostly) flat, planar, and solid. In some embodiments, aside from mounting-ear(s) 307, perimeter-fence 323, and shirt 335, main-planar-member 301 may be at least substantially (mostly) flat and planar. In some embodiments, the flat, planar, and solid qualities of main-planar-member 301 may be broken/interrupted by one or more of: aperture-for-housing-can 305, mounting-ear(s) 307, cutout-for-mounting-ear 313, slot-for-mounting 321, perimeter-fence 323, skirt 335, portions thereof, combinations thereof, and/or the like.

Figure 3D:
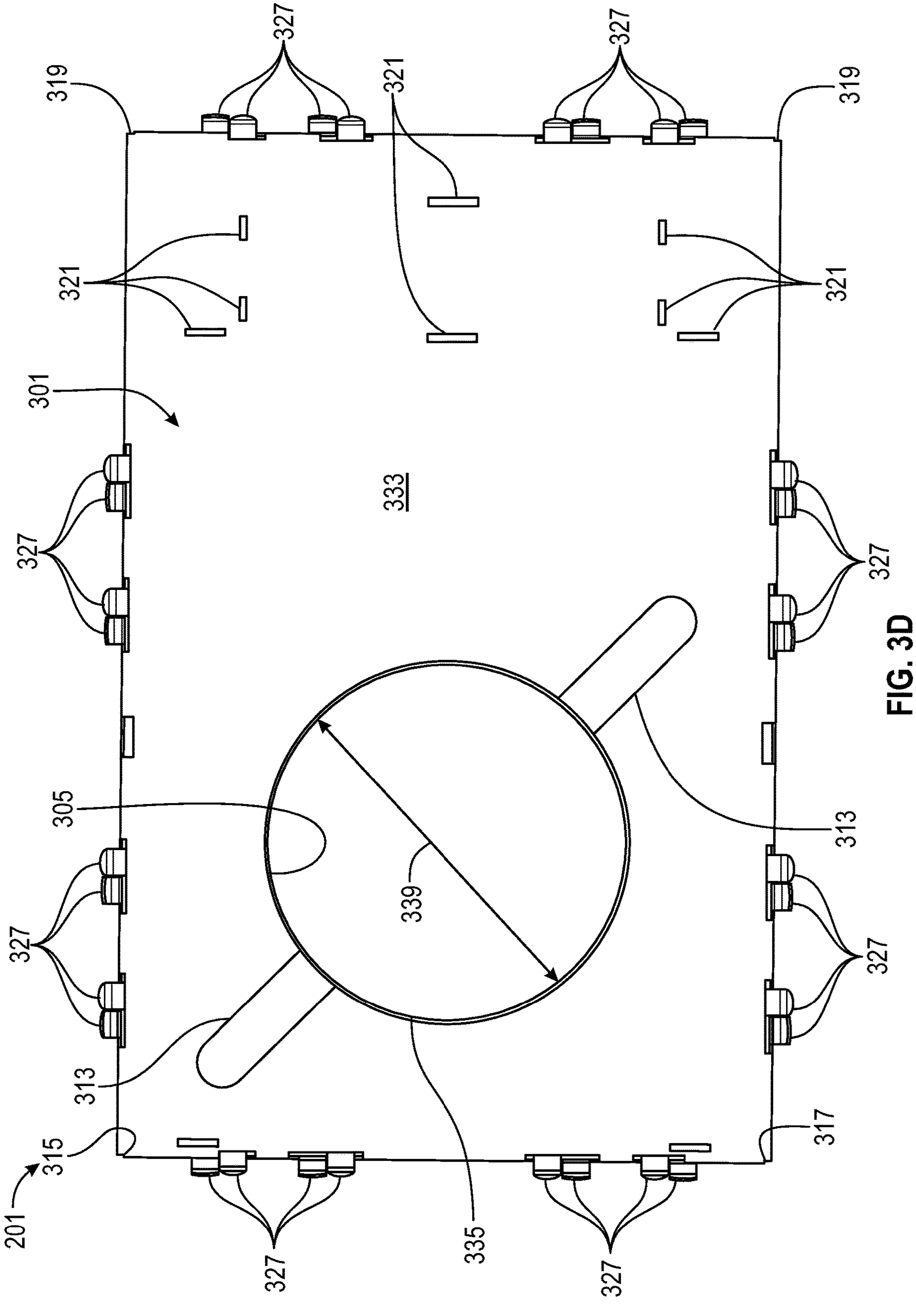
FIG. 3D is a bottom view of just the mounting-frame of FIG. 3A.

Continuing discussing FIG. 3A, in some embodiments, main-planar-member 301 may have a top 303 (top-side 303/top-surface 303) and an opposing bottom 333 (bottom-side 333/bottom-surface 333) (see e.g., FIG. 3B and FIG. 3D for bottom 333). In some embodiments, top 303 (top-side 303/top-surface 303) may be a top (side and/or surface) of main-planar-member 301.

Continuing discussing FIG. 3A, in some embodiments, main-planar-member 301 may comprise an aperture-for-housing-can 305 (aperture 305). In some embodiments, aperture-for-housing-can 305 may be a through hole within main-planar-member 301 that may be configured to receive at least a portion of a housing-can 221 therein. In some embodiments, housing-can 221 may be configured to house at least one light source. In some embodiments, aperture-for-housing-can 305 may be surround/circumscribe a region of hollow/void area/volume. In some embodiments, aperture-for-housing-can 305 may have a fixed dimension (e.g., diameter 339) that may be sized and shaped to fit an outside dimension (e.g., diameter 429) of housing-can 221 within aperture-for-housing-can 305. In some embodiments, main-planar-member 301 may comprise only one aperture-for-housing-can 305; at least one aperture-for-housing-can 305; or one or more aperture-for-housing-can 305. In some embodiments, aperture-for-housing-can 305 may be at least substantially (mostly) round and/or circular when viewed from above (see also FIG. 3C) or from below (see e.g., FIG. 3B and/or FIG. 3D).

Continuing discussing FIG. 3A, in some embodiments, main-planar-member 301 may comprise at least one mounting-ear 307. In some embodiments, mounting-frame 201 may comprise at least one mounting-ear 307. In some embodiments, main-planar-member 301 (and/or mounting-frame 201) may comprise two (2) mounting-ears 307. In some embodiments, main-planar-member 301 (and/or mounting-frame 201) may comprise only two (2) mounting-ears 307. In some embodiments, the (only) two (2) mounting-ears 307 may be oppositely disposed from each other along aperture-for-housing-can 305. In some embodiments, mounting-ear(s) 307 may extend orthogonally (vertically) upwards away from top 303 by a finite, predetermined, and fixed distance. In some embodiments, mounting-frame 201 may comprise main-planar-member 301, aperture-for-housing-can 305, and (only) two mounting-ears 307. In some embodiments, (only) two mounting-ears 307 may extend orthogonally above top-surface 303. In some embodiments, the two mounting-ears 307 may also extend (upwards) from opposing sides of aperture-for-housing-can 305. In some embodiments, the two mounting-ears 307 may be configured for attachment to housing-can 221. In some embodiments, the two mounting-ears 307 may be formed from material of the main-planar-member 301 such that the two mounting-ears 307 and the main-planar-member 301 are integral with each other being of the same article of manufacture.

Continuing discussing FIG. 3A, in some embodiments, a given mounting-ear 307 may comprise at least one aperture-in-mounting-ear 309 (aperture 309). In some embodiments, a given mounting-ear 307 may comprise two (2) apertures-in-mounting-ear 309. In some embodiments, a given mounting-ear 307 may comprise only two (2) apertures-in-mounting-ear 309. In some embodiments, aperture-in-mounting-ear 309 may be a through hole that passes entirely through a thickness of its respective mounting-ear 307. In some embodiments, aperture-in-mounting-ear 309 may be configured to receive and/or complementary interact with fastener 225 and/or fastener 226. In some embodiments, each of the two mounting-ears 307 may have (only) two apertures 309. In some embodiments, each aperture 309 selected from the two apertures 309 may be configured to receive at least a portion of a fastener 225/226. In some embodiments, with respect to each mounting-ear 307, the two (2) apertures-in-mounting-ear 309 may be vertically oriented with respect to each other, i.e., a top most aperture-in-mounting-ear 309 and a bottom most aperture-in-mounting-ear 309 (per each mounting-ear 307). See also FIG. 3B.

Continuing discussing FIG. 3A, in some embodiments, a given mounting-ear 307 may have a fixed, finite, and/or predetermined height-of-mounting-ear 311 (height/length 311). In some embodiments, the heights 311 of both mounting-ears 307 may be the same.

Continuing discussing FIG. 3A, in some embodiments, mounting-ear 307 may be formed from main-planar-member 301, by making a cutout-for-mounting-ear 313 (cutout 313) in main-planar-member 301 and the bending the resulting cutout portion upwards to form the given mounting-ear 307. In some embodiments, a shape of cutout-for-mounting-ear 313 may be substantially similar to a shape of mounting-ear 307 (with cutout-for-mounting-ear 313 being slightly larger than its formed mounting-ear 307). Thus, because mounting-ear 307 may be elongate, then cutout-for-mounting-ear 313 may be elongate. In some embodiments, a given mounting-ear 307 may always be associated with a given cutout-for-mounting-ear 313. In some embodiments, a bottom portion of a given mounting-ear 307 may always be physically touching its associated cutout-for-mounting-ear 313. In some embodiments, there may be a one-to-one correspondence between mounting-ear(s) 307 and cutout(s)-for-mounting-ear 313.

In some embodiments, mounting-ear(s) 307 may be integral portions of main-planar-member 301; wherein mounting-ear(s) 307 (along with fastener(s) 225 and/or fastener(s) 226) may be configured for (removable) attachment to housing-can 221 (via aperture(s)-for-mounting 403 of 221). In some embodiments, mounting-ear 307 may be used (at least in part) for (removable) attaching mounting-frame 201 (main-planar-member 301) to housing-can 221.

In some embodiments, because mounting-ear(s) 307 may be integral with main-planar-member 301 and/or formed from main-planar-member 301, then physically separate mounting brackets for attaching a housing-can to a mounting-frame are not necessary in recessed-lighting-assembly 200. Further, because such separate mounting brackets are not used in recessed-lighting-assembly 200, then recessed-lighting-assembly 200 is cheaper and/or more efficient to manufacture as compared to prior art recessed lighting assemblies that use such separate mounting brackets. In such prior art recessed lighting assemblies these separate mounting brackets are usually L-brackets or the like.

Continuing discussing FIG. 3A, in some embodiments, main-planar-member 301 may comprise at least one slot-for-mounting 321 (slot 321). In some embodiments, main-planar-member 301 may comprise one or more slots-for-mounting 321. In some embodiments, main-planar-member 301 may comprise a plurality of slots-for-mounting 321. In some embodiments, slot-for-mounting 321 may be configured for (removable) attachment to junction-box 231. In some embodiments, slot-for-mounting 321 may be located on main-planar-member 301 in a region/portion of main-planar-member 301 that is disposed opposite from (away from) aperture-for-housing-can 305, mounting-ear 307, cutout-for-mounting-ear 313, corner 315, and corner 317.

Continuing discussing FIG. 3A, in some embodiments, main-planar-member 301 may comprise at least one slot 322. In some embodiments, main-planar-member 301 may comprise one or more slots 322. In some embodiments, main-planar-member 301 may comprise a plurality of slots 322. In some embodiments, slot(s) 322 are not used for (removable) attachment to junction-box 231. In some embodiments, slot(s) 322 and slot-for-mounting 321 may be located on different regions/portions of main-planar-member 301. In some embodiments, slot(s) 322 may be located on main-planar-member 301 in a region/portion of main-planar-member 301 that has aperture-for-housing-can 305, mounting-ear 307, cutout-for-mounting-ear 313, corner 315, and/or corner 317.

Continuing discussing FIG. 3A, in some embodiments, main-planar-member 301 may comprise perimeter-fence 323. In some embodiments, mounting-frame 201 may comprise perimeter-fence 323. In some embodiments, perimeter-fence 323 may be located around an outside boundary of main-planar-member 301. In some embodiments, perimeter-fence 323 may have a height 325 that may extend substantially orthogonally away from top-surface 303 or from bottom-surface 333. In some embodiments, perimeter-fence 323 may be formed from exterior portions of main-planar-member 301 by at least bending those exterior portions, such that the perimeter-fence 323 and the main-planar-member 301 are integral with each other being of the same article of manufacture. In some embodiments, perimeter-fence 323 may form a barrier and/or a lip around the outside periphery of main-planar-member 301. In some embodiments, an outside edge/perimeter of main-planar-member 301 may be turned/bent upwards to form a fence/sidewall structure, termed perimeter-fence 323. In some embodiments, perimeter-fence 323 may be an outside fence structure, that may run at least substantially (mostly) around an outside perimeter/edge of main-planar-member 301. In some embodiments, perimeter-fence 323 may be extend at least substantially (mostly) orthogonally upwards away from top 303. In other embodiments, perimeter-fence 323 may be extend at least substantially (mostly) orthogonally downwards away from bottom 333.

Continuing discussing FIG. 3A, in some embodiments, perimeter-fence 323 may have a height-of-perimeter-fence 325. In some embodiments, height-of-perimeter-fence 325 may be height of perimeter-fence 323. In some embodiments, height-of-perimeter-fence 325 may be fixed, finite, and/or predetermined. In some embodiments, height-of-perimeter-fence 325 may be of two different heights, a longer height along most of perimeter-fence 323 and a shorter height along notch 331 (see also FIG. 3E and/or FIG. 3F).

Continuing discussing FIG. 3A, in some embodiments, perimeter-fence 323 may comprise bracket-for-hanger-bar 327. In some embodiments, brackets-for-hanger-bar 327 may be structures of perimeter-fence 323 that are configured for removable attachment to hanger-bar 211. In some embodiments, brackets-for-hanger-bar 327 may be finger like projection structures of perimeter-fence 323 that are configured for removable attachment to hanger-bar 211. In some embodiments, each side of perimeter-fence 323 may comprise a plurality of brackets-for-hanger-bar 327. In some embodiments, each side of a pair of opposing perimeter-fence 323 sides may comprise a plurality of brackets-for-hanger-bar 327.

Continuing discussing FIG. 3A, in some embodiments, brackets-for-hanger-bar 327 may be formed from cutouts 329 in perimeter-fence 323. In some embodiments, cutouts 329 may be cutouts in perimeter-fence 323 that may be used to form brackets-for-hanger-bar 327. In some embodiments, perimeter-fence 323 may comprise cutouts 329 that are bent to form brackets-for-hanger-bars 327. In some embodiments, brackets-for-hanger-bars 327 are configured for attachment to at least one hanger-bar 211. In some embodiments, any exterior side of perimeter-fence 323, via brackets-for-hanger-bars 327, is configured for attachment to the at least one hanger-bar 211. In some embodiments, each rectangular side of perimeter-fence 323 may have four (4) distinct cutouts 329. In some embodiments, each cutout 329 may have (only) two (2) brackets-for-hanger-bar 327 (one upward protruding from a bottom and one downward protruding from the top). See also FIG. 2A that shows brackets-for-hanger-bars 327 retaining hanger-bars 211.

Continuing discussing FIG. 3A, in some embodiments, perimeter-fence 323 may comprise a notched 331 region. In some embodiments, notch 331 may be a region/portion of perimeter-fence 323 that has the shorter height 325. In some embodiments, notch 331 may be located on the portion/region of main-planar-member 301 that has the slot(s)-for-mounting 321. In some embodiments, the shorter height 325 of notch 331 may permit larger and/or different sizes of junction-boxes 231 and/or facilitate installation of junction-boxes 231 to main-planar-member 301.

FIG. 3B is a bottom perspective view of just mounting-frame 201 (shown without other parts/components of recessed-lighting-assembly 200). In some embodiments, bottom 333 (bottom-side 333/bottom-surface 333) may be a bottom (side and/or surface) of main-planar-member 301. In some embodiments, top 303 and bottom 333 may be at least substantially (mostly) disposed opposite from each other. In some embodiments, top 303 and bottom 333 may be separated from each other by a thickness of main-planar-member 301. In some embodiments, the thickness of main-planar-member 301 may be at least substantially fixed, constant, and/or uniform. In some embodiments, aperture-for-housing-can 305 may be at least substantially (mostly) round and/or circular when viewed from below (see also FIG. 3D).

Continuing discussing FIG. 3B, in some embodiments, main-planar-member 301 may comprise one skirt 335 per each aperture-for-housing-can 305. In some embodiments, skirt 335 may be referred to a collar 335. In some embodiments, mounting-frame 201 may comprise skirt 335. In some embodiments, skirt 335 may extend orthogonally below and from bottom-surface 333 along aperture-for-housing-can 305. In some embodiments, skirt 335 may be configured to guide at least a portion of housing-can 221 into a desired position/alignment with respect to the mounting-frame 201. In some embodiments, skirt 335 may extend orthogonally (vertically) downwards away from bottom 333 by a finite, predetermined, and fixed distance. In some embodiments, skirt 335 may extend orthogonally (vertically) downwards away from bottom 333 from aperture-for-housing-can 305. In some embodiments, skirt 335 may be surround/circumscribe a region of hollow/void volume. In some embodiments, a shape of skirt 335 may be at least substantially the same as the shape of aperture-for-housing-can 305, when viewed from above or from below (see also FIG. 3D). In some embodiments, a shape of skirt 335 may be round, circular, and/or the like, when viewed from below (see also FIG. 3D). In some embodiments, skirt 335 may be concentric, in vertical alignment, and/or colinear with aperture-for-housing-can 305. In some embodiments, aperture-for-housing-can 305 may be located directly above skirt 335. In some embodiments, skirt 335 may be located directly below aperture-for-housing-can 305. In some embodiments, aperture-for-housing-can 305 may be directly, permanently, and/or integrally attached to skirt 335. In some embodiments, skirt 335 and aperture-for-housing-can 305 may together form a hollow (right) cylinder (cylindrical) structure. In some embodiments, skirt 335 may be downward projection/extension of aperture-for-housing-can 305. In some embodiments, skirt 335 may have a fixed dimension (e.g., diameter 339) that may be sized and shaped to fit an outside dimension (e.g., diameter 429) of housing-can 221 into/within skirt 335. In some embodiments, skirt 335 (extending downwards) and perimeter-fence 323 (extending upwards) may face/extend in opposite directions from each other.

In some embodiments, skirt 335 may be configured to act/function as a guide to facilitate guiding housing-can 221 into a desired/proper position/alignment with respect to mounting-frame 201. In some embodiments, skirt 335 may be configured to act/function as a guide/template for creating a complementary shaped and sized hole in ceiling material, such as, but not limited to drywall (sheetrock); that is, a hole may be cut into the ceiling material that corresponds with the shape and size (e.g., diameter 339) of the bottom of skirt 335, by using skirt 335 as a guide/template (for the cutting tool). In some embodiments, mounting-frame 201 may be installed to the ceiling joists (or the like) prior to the ceiling material being installed. Or in the alternative, in some embodiments, the ceiling material may be installed before mounting-frame 201 may be installed to the ceiling joists (or the like). In either scenario, skirt 335 may function as a guide/template for the proper corresponding hole in the ceiling material. Skirt 335 facilitates faster and/or more efficient ceiling installations. Without skirt 335, ceiling installers may rely instead upon a housing can's diameter or the like for cutting the hole in the ceiling material, which means that the housing can may need to be installed in its mounting frame before the ceiling hole is made, which in turn is a restriction upon the order of operations with respect to the ceiling installation and the recessed lighting installation therein. Use of skirt 335 provides more freedom in such order of operations.

FIG. 3C is a top view of just mounting-frame 201 (shown without other parts/components of recessed-lighting-assembly 200). In some embodiments, aperture-for-housing-can 305 may be at least substantially (mostly) round and/or circular when viewed from above. In some embodiments, skirt 335 may have a height-of-skirt 337 (height 337). In some embodiments, height-of-skirt 337 may be height (tallness) of skirt 335. In some embodiments, height-of-skirt 337 may be fixed, finite, non-variable, uniform, and/or predetermined. In some embodiments, skirt 335 and/or aperture-for-housing-can 305 may have a diameter 339. In some embodiments, diameter 339 may be (an inside) diameter of skirt 335. In some embodiments, diameter 339 may be fixed, finite, non-variable, uniform, and/or predetermined. In some embodiments, diameter 339 may be larger than diameter 429 (of housing-can 221). In some embodiments, skirt 335 may have a right cylindrical shape. In some embodiments, fitted around diameter 339 of skirt 335 may be a gasket.

Continuing discussing FIG. 3C, in some embodiments, main-planar-member 301 may be at least substantially rectangular shaped (e.g., not including perimeter projections of brackets-for-hanger-bar 327) when viewed from above or from below (see e.g., FIG. 3D). In some embodiments, main-planar-member 301 may be substantially rectangular in shape when reviewed from above (or from below). Thus, main-planar-member 301 may have four (4) main corners corresponding to corners of its rectangular shape (when viewed from above or below). In some embodiments, main-planar-member 301 may comprise corner 315, which may be a corner that is closest to a mounting-ear 307 and/or closest to a cutout-for-mounting-ear 313; thus, corner 315 may be referred to as corner-nearest-mounting-ear 315 (or as corner 315). In some embodiments, main-planar-member 301 may have only one such corner 315. In some embodiments, a next main corner that may be closest to corner 315 may be corner 317. In some embodiments, corner 317 and corner 315 may be at least substantially equidistant to a portion of aperture-for-housing-can 305; however, corner 317 may not be as close to a mounting-ear 307 and/or may not be as close to a cutout-for-mounting-ear 313 as compared to corner 315 which may be closer. In some embodiments, main-planar-member 301 may have only one such corner 317. In some embodiments, the two remaining main corners of main-planar-member 301 may be two (2) corners 319. In some embodiments, corner(s) 319 may be located closer to slot(s)-for-mounting 321 and/or to junction-box 231 than to: aperture-for-housing-can 305, mounting(s)-ear 307, cutout(s)-for-mounting-ear 313, and/or housing-can 221. In some embodiments, corner(s) 319 may be referred to as corner(s)-away-from-housing-can 319 (or as corner(s) 319). In some embodiments, slot(s)-for-mounting 321 may be located closer to corners 319 and further away from corner 315 and from corner 317. In some embodiments, slot(s) 322 may be located closer to corner 315 and/or to corner 317 and further away from corners 319. Note, these four (4) main corners (e.g., corner 315, corner 317, and corners 319) of main-planar-member 301 may be visible from above or below (see e.g., FIG. 3D).

Continuing discussing FIG. 3C, in some embodiments, one and only one cutout-for-mounting-ear 313 may point towards corner 315; whereas, the 180 degree opposing cutout-for-mounting-ear 313 may not point towards any of the main corners (e.g., not corner 315, not corner 317, and not corners 319) of main-planar-member 301.

Continuing discussing FIG. 3C, in some embodiments, the two mounting-ears 307 may lay upon a same linear line when the main-planar-member 301 is viewed from above. In some embodiments, that same linear line may run diagonally from one main corner 315 of main-planar-member 301. In some embodiments, that same linear line does not run into any other main corners 317/319 of main-planar-member 301.

Continuing discussing FIG. 3C, in some embodiments, the two mounting-ears 307 may be formed from two elongate cutouts 313 in main-planar-member 301. In some embodiments, a length of one of the two elongate cutouts 313 may point at a main corner 315 of main-planar-member 301. In some embodiments, a length of the other of the two elongate cutouts 313 does not point at any of the main corners 315/317/319 of main-planar-member 301. In some embodiments, the one of the two elongate cutouts 313 that may point at the main corner 315 of main-planar-member 301 may also be proximate to that main corner 315, wherein proximate in this context is at one inch or less.

Continuing discussing FIG. 3C, in some embodiments, main-planar-member 301 (and/or mounting-frame 201) may have a length 341. In some embodiments, length 341 may be an overall length of main-planar-member 301 (and/or of mounting-frame 201). In some embodiments, length 341 may be fixed, finite, uniform, and/or predetermined. In some embodiments, main-planar-member 301 (and/or mounting-frame 201) may have a width 343. In some embodiments, width 343 may be an overall transverse width of main-planar-member 301 (and/or of mounting-frame 201). In some embodiments, width 343 may be fixed, finite, uniform, and/or predetermined. In some embodiments, length 341 may be at least substantially (mostly) perpendicular to width 343. In some embodiments, length 341 may be longer than width 343.

Continuing discussing FIG. 3C, in some embodiments, with respect to length 341, aperture-for-housing-can 305 may be located entirely within one-half (0.5) of that length 341. In some embodiments, aperture-for-housing-can 305 may be located in a half (0.5) of main-planar-member 301 that does not include slot(s)-for-mounting 321. In some embodiments, aperture-for-housing-can 305 may be located in a half (0.5) of main-planar-member 301 that does not include where junction-box 231 may be attached to main-planar-member 301. In some embodiments, slot(s)-for-mounting 321 may be located in a half (0.5) of main-planar-member 301 that does not include aperture-for-housing-can 305. In some embodiments, aperture-for-housing-can 305 and slot(s)-for-mounting 321 (and/or junction-box 231) may occupy different halves of main-planar-member 301.

In some embodiments, main-planar-member 301 may comprise structures (such as but not limited to, slot(s)-for-mounting 321) for attaching to junction-box 231. In some embodiments, with respect to length 341 of main-planar-member 301, aperture-for-housing-can 305 and the structures for attaching to junction-box 231 occupy different halves of main-planar-member 301.

Continuing discussing FIG. 3C, in some embodiments, the main/major surfaces/planes of the two (2) opposing mounting-ears 307 may extending from top 333 along a same circle path (at 180 degrees opposing from each other), wherein that circle path may be colinear and/or concentric with aperture-for-housing-can 305 and/or with skirt 335.

FIG. 3D is a bottom view of just mounting-frame 201 (shown without other parts/components of recessed-lighting-assembly 200). In some embodiments, aperture-for-housing-can 305 may be at least substantially (mostly) round and/or circular when viewed from below. In some embodiments, the four (4) main corners (e.g., corner 315, corner 317, and corners 319) of main-planar-member 301 may be visible from below.

Figure 3E:
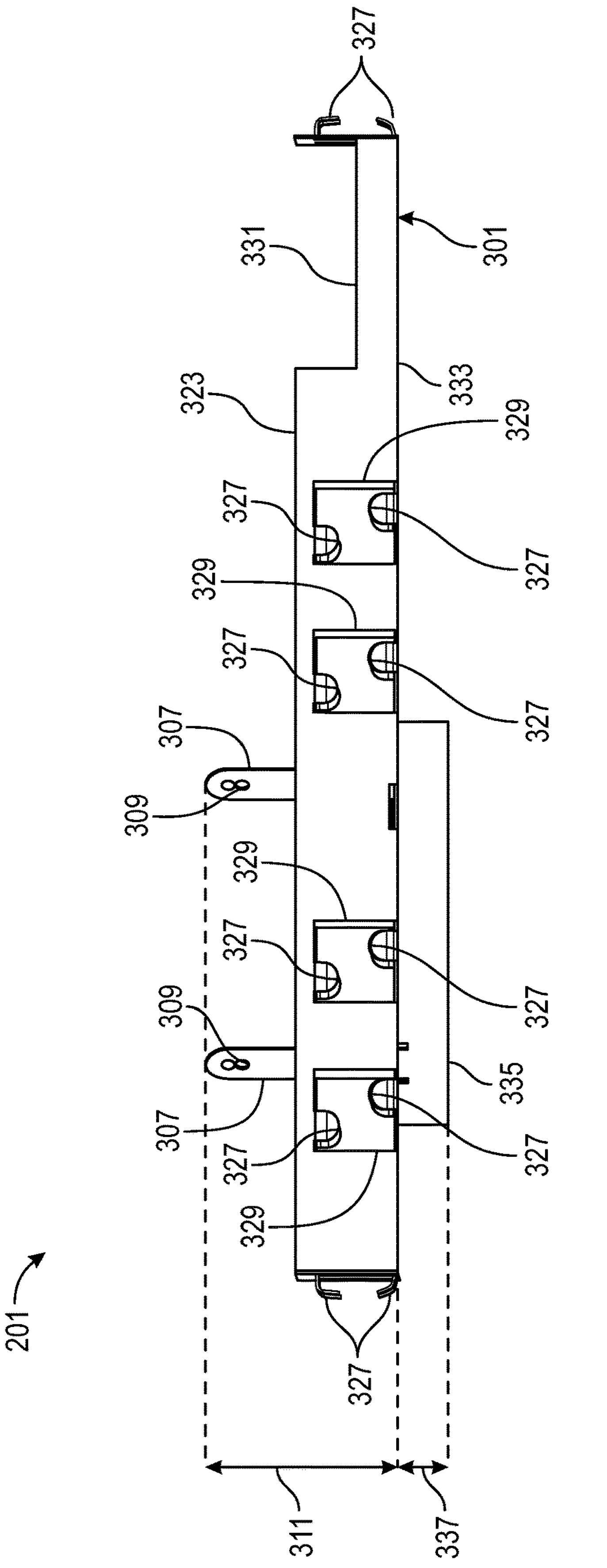
FIG. 3E is a front view of just the mounting-frame of FIG. 3A.

FIG. 3E is a front view of just mounting-frame 201 (shown without other parts/components of recessed-lighting-assembly 200). In some embodiments, height-of-perimeter-fence 325 may be of two different heights, the longer height along most of perimeter-fence 323 and a shorter height along notch 331 (see also FIG. 3F). In some embodiments, height-of-skirt 337 may be less than height-of-perimeter-fence 325 of perimeter-fence 323 not at notch 331. In some embodiments, height-of-skirt 337 may be taller than height-of-perimeter-fence 325 of perimeter-fence 323 at notch 331. In some embodiments, height-of-mounting-ear 311 may be taller than height-of-perimeter-fence 325 and/or taller than height-of-skirt 337. In some embodiments, height-of-mounting-ear 311 may be about twice as tall as height-of-perimeter-fence 325 (not at notch 331), plus or minus five (5) percent. In some embodiments, height-of-mounting-ear 311 may be about four (4) times as tall as height-of-skirt 337, plus or minus five (5) percent.

Figure 3F:
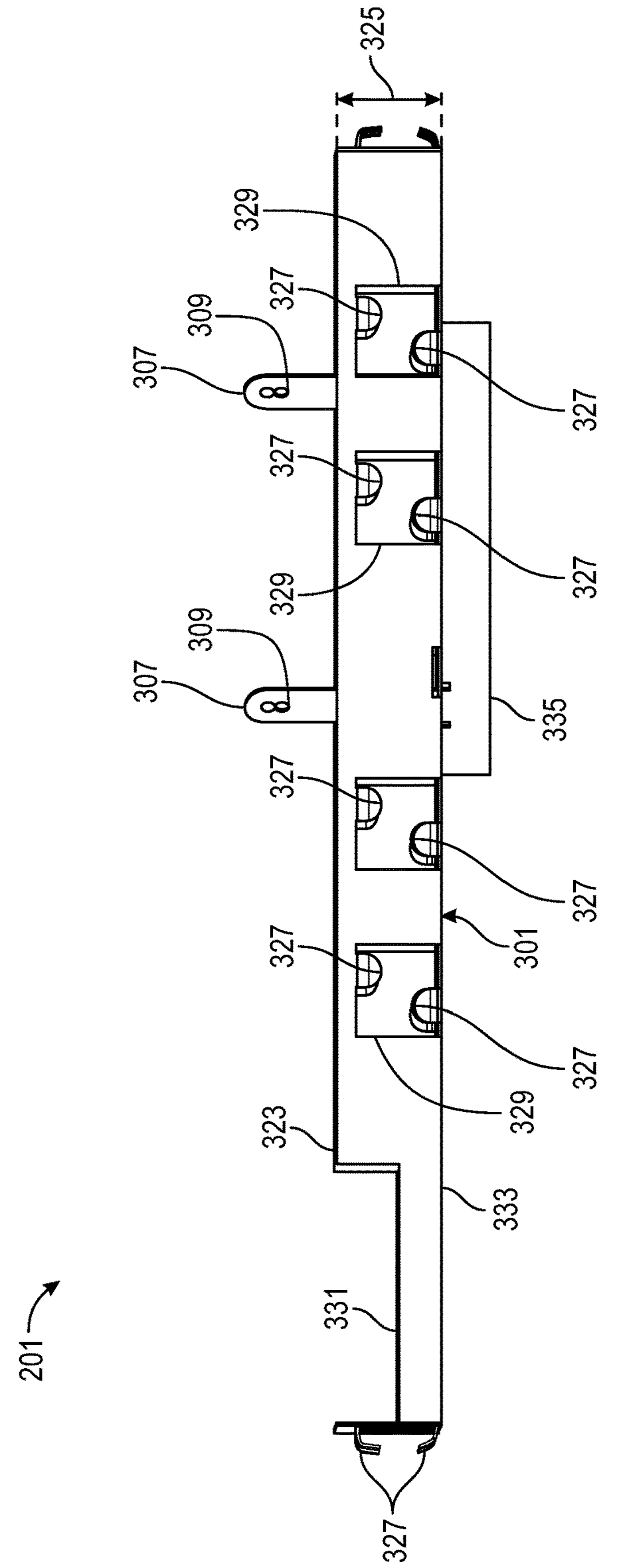
FIG. 3F is a rear (back) view of just the mounting-frame of FIG. 3A.

FIG. 3F is a rear (back) view of just mounting-frame 201 (shown without other parts/components of recessed-lighting-assembly 200). In some embodiments, FIG. 3F and FIG. 3E may be opposing views from each other.

Figure 3G:
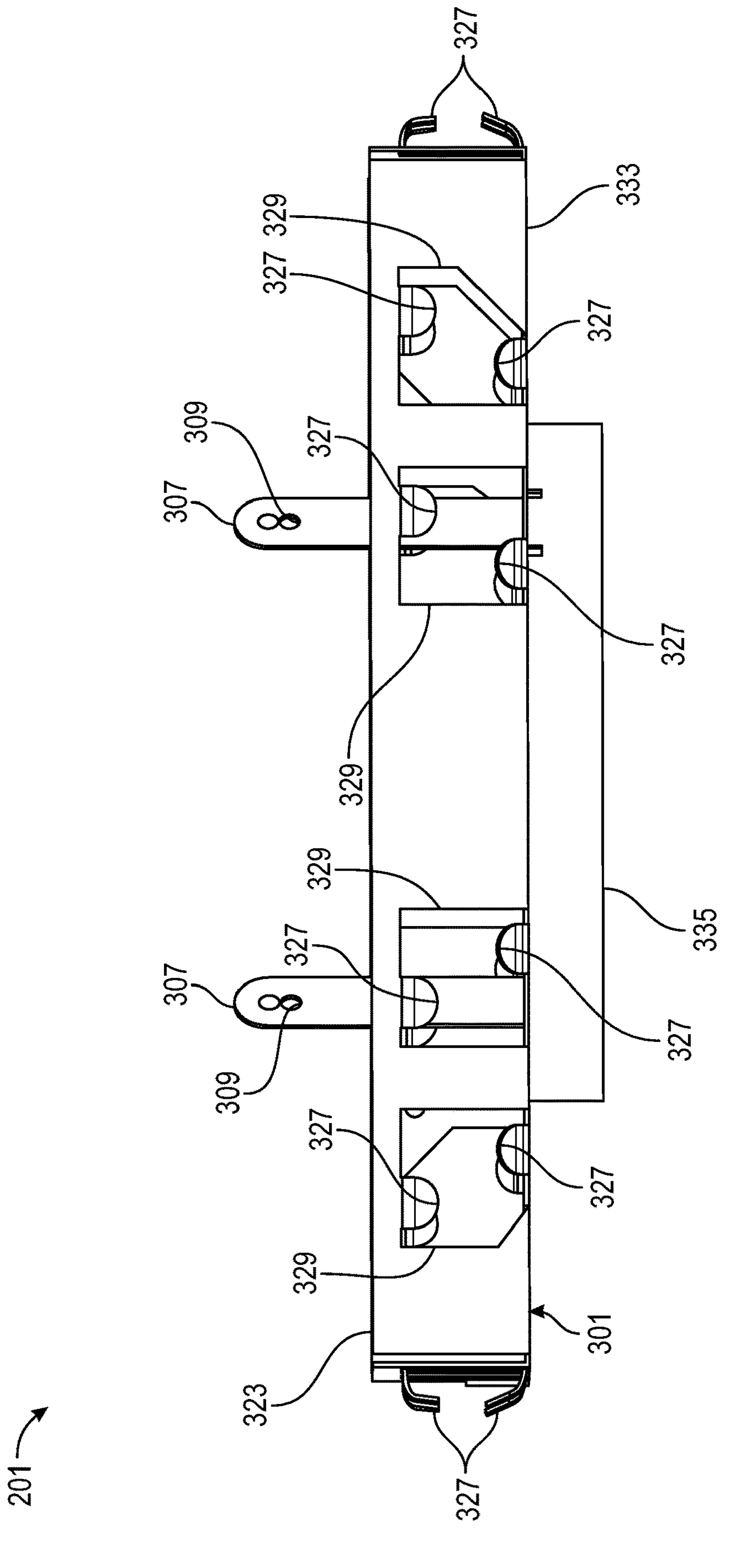
FIG. 3G is a left-side view of just the mounting-frame of FIG. 3A.

FIG. 3G is a left-side view of just mounting-frame 201 (shown without other parts/components of recessed-lighting-assembly 200). In some embodiments, notch 331 may not be visible in FIG. 3G.

Figure 3H:
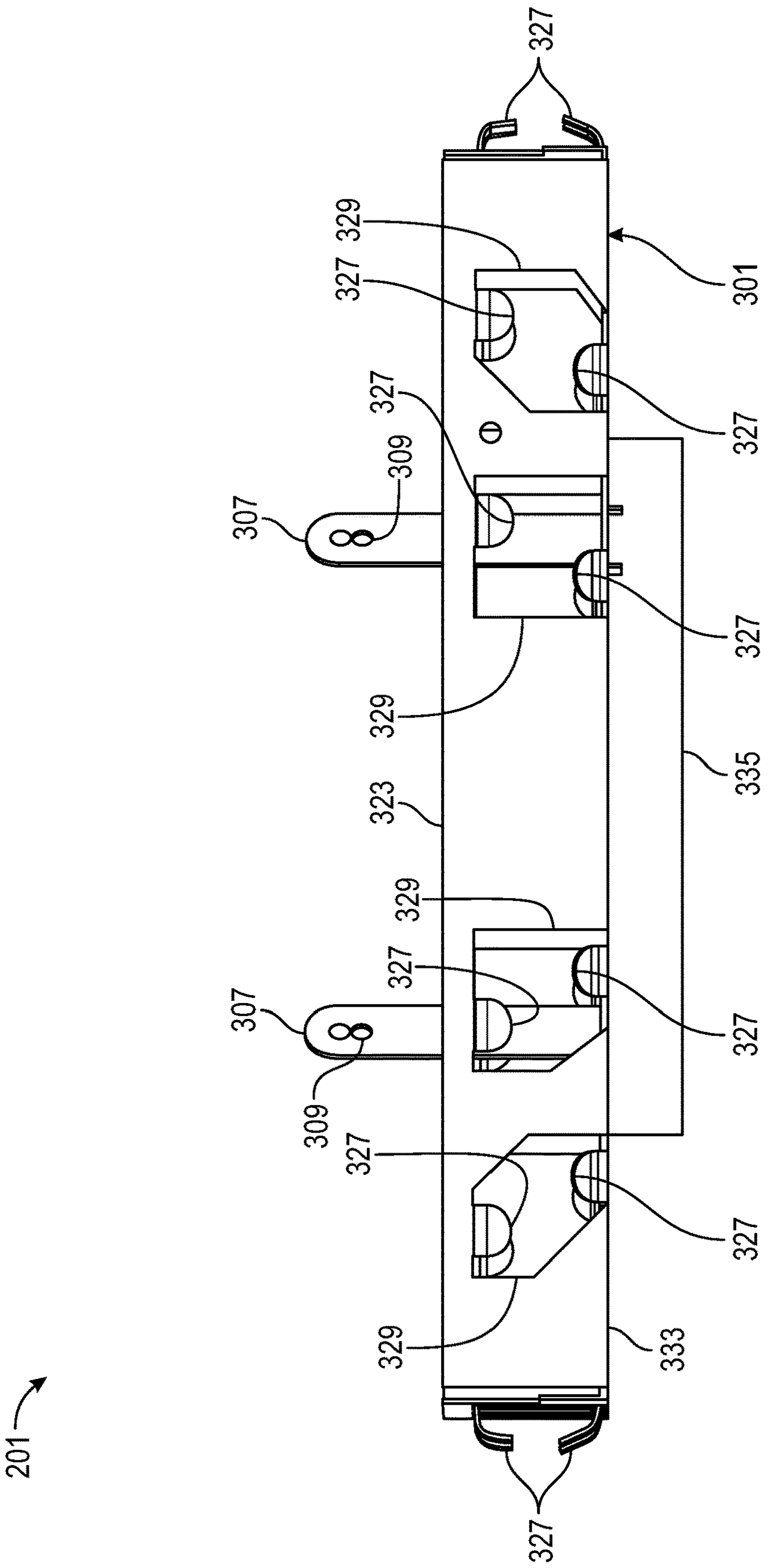
FIG. 3H is a right-side view of just the mounting-frame of FIG. 3A.

FIG. 3H is a right-side view of just mounting-frame 201 (shown without other parts/components of recessed-lighting-assembly 200). In some embodiments, FIG. 3G and FIG. 3H may be opposing views from each other. In some embodiments, sides of notch 331 may be visible in FIG. 3H.

In some embodiments, with respect to the two (2) apertures-in-mounting-ear 309 per each mounting-ear 307, only the top most aperture-in-mounting-ear 309 (per each mounting-ear 307) may be visible from front, rear, and side views. In some embodiments, height-of-perimeter-fence 325 of perimeter-fence 323 may be height enough to block views of the bottom most aperture-in-mounting-ear 309 (per each mounting-ear 307) in the front, rear, and side views. Compare FIG. 3A and FIG. 3B to FIG. 3E to FIG. 3H.

In some embodiments, mounting-frame 201, main-planar-member 301, mounting-ear(s) 307, perimeter-fence 323, bracket(s)-for-hanger-bar 327, portions thereof, combinations thereof, and/or the like may be at least substantially (mostly) made from at least one of a same material. In some embodiments, mounting-frame 201, main-planar-member 301, mounting-ear(s) 307, perimeter-fence 323, bracket(s)-for-hanger-bar 327, portions thereof, combinations thereof, and/or the like may be at least substantially (mostly) made from at least one metal (and/or metal alloy), such as, but not limited to, steel.

In some embodiments, mounting-frame 201, main-planar-member 301, mounting-ear(s) 307, perimeter-fence 323, bracket(s)-for-hanger-bar 327, portions thereof, combinations thereof, and/or the like may be at least partially to fully colored, painted, coated, powder coated, galvanized, portions thereof, combinations thereof, and/or the like.

In some embodiments, mounting-frame 201, main-planar-member 301, mounting-ear(s) 307, perimeter-fence 323, bracket(s)-for-hanger-bar 327, portions thereof, combinations thereof, and/or the like may be integral with each other, that is, of a single article of manufacture.

Because separate and independent brackets (e.g., L-brackets) are not needed and not used to attach the housing-can 221 to the mounting-frame 201, such a resulting assembly 200 saves costs by avoiding such separate and independent brackets and also results in a faster and more efficient manufacturing process because the assembly 200 has less parts (as compared to prior art assemblies that do use separate and independent brackets for attaching a housing can to a mounting frame).

In some embodiments, mounting-frame 201 may comprise at least one: main-planar-member 301, top 303 (top-surface 303), aperture-for-housing-can 305, mounting-ear 307, aperture-in-mounting-ear 309, height-of-mounting-ear 311, cutout-for-mounting-ear 313, corner-nearest-mounting-ear 315 (corner 315), corner 317, corner-away-from-housing-can 319 (corner 319), slot-for-mounting 321, slot 322, perimeter-fence 323, height-of-perimeter-fence 325, bracket-for-hanger-bar 327, cutout 329, notch 331, bottom 333 (bottom-surface 333), skirt 335 (collar 335), height-of-skirt 337, diameter 339, length 341, width 343, portions thereof, combinations thereof, and/or the like.

In some embodiments, mounting-frame 201 may comprise one or more of: main-planar-member 301, top 303 (top-surface 303), aperture-for-housing-can 305, mounting-ear 307, aperture-in-mounting-ear 309, height-of-mounting-ear 311, cutout-for-mounting-ear 313, corner-nearest-mounting-ear 315 (corner 315), corner 317, corner-away-from-housing-can 319 (corner 319), slot-for-mounting 321, slot 322, perimeter-fence 323, height-of-perimeter-fence 325, bracket-for-hanger-bar 327, cutout 329, notch 331, bottom 333 (bottom-surface 333), skirt 335 (collar 335), height-of-skirt 337, diameter 339, length 341, width 343, portions thereof, combinations thereof, and/or the like.

Figure 4A:
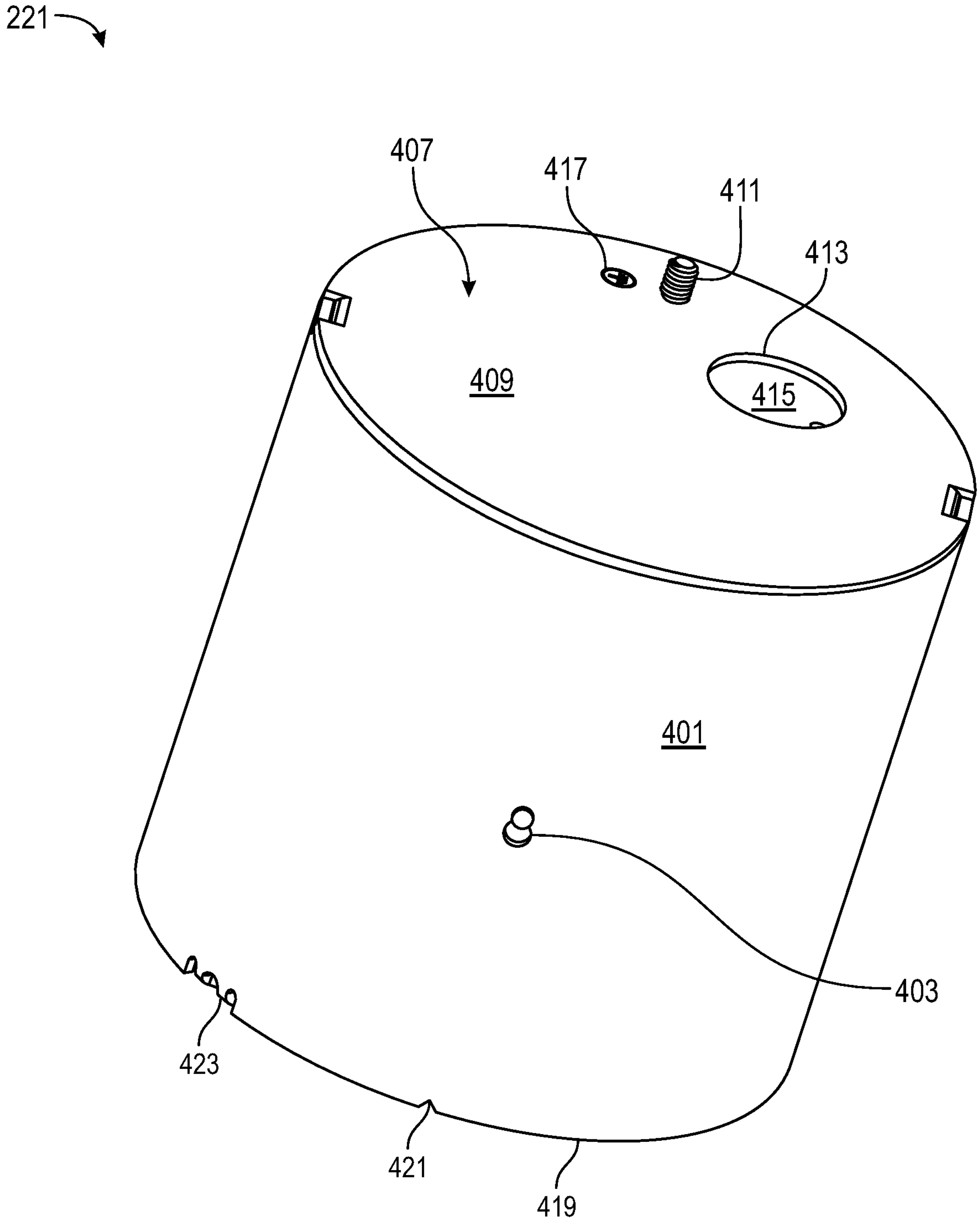
FIG. 4A is a top perspective view of just a housing-can (shown without other parts/components of the recessed-lighting-assembly of FIG. 2A).

FIG. 4A is a top perspective view of just housing-can 221 (shown without other parts/components of recessed-lighting-assembly 200). In some embodiments, housing-can 221 may be configured to house at least some electronics typical of a recessed (down) lighting assembly, such as, but not limited to: at least one light source (e.g., a light emitting diode [LED]; an incandescent light source; a fluorescent light source; a CFL (compact fluorescent light) source; a halogen light source; a neon light source; a sodium light source; a predetermined light source; at least a portion of an electronic circuit that emits light; portions thereof; combinations thereof; and/or the like); a driver; a chip; a circuit; a printed circuit board (PCB); wiring/cabling; portions thereof; combinations thereof; and/or the like. In some embodiments, housing-can 221 may be configured to house at least a portion of a heat sink, a lens, an optical reflector, a trim, portions thereof, combinations thereof, and/or the like.

Continuing discussing FIG. 4A, in some embodiments, housing-can 221 may be at least substantially (mostly) shaped as right cylindrical member, with an open end and an opposing closed end. In some embodiments, the closed end may be at top 409 and the open end may be at bottom 419 of housing-can 221.

In some embodiments, housing-can 221 may comprise a sidewall 401. In some embodiments, sidewall 401 may be a sidewall of housing-can 221. In some embodiments, sidewall 401 may run from bottom 419 to top 409. In some embodiments, sidewall 401 may be at least substantially solid and without breaks or openings, except at predetermined locations along sidewall 401, such as, but not limited to, aperture-for-mounting 403 and/or aperture-for-knockout 413.

Continuing discussing FIG. 4A, in some embodiments, sidewall 401 may comprise at least one aperture-for-mounting 403. In some embodiments, sidewall 401 may comprise one or more aperture-for-mounting 403. In some embodiments, sidewall 401 may comprise two (2) opposing apertures-for-mounting 403. In some embodiments, sidewall 401 may comprise two (2) pairs of opposing apertures-for-mounting 403, so four (4) apertures-for-mounting 403 in total. In some embodiments, aperture-for-mounting 403 may be a through hole that passes entirely through a thickness of sidewall 401. In some embodiments, aperture-for-mounting 403 may be configured to receive a portion of fastener 225 and/or of fastener 226 for a purpose of (removably) attaching housing-can 221 to mounting-ears 307 of mounting-frame 201. In some embodiments, a height alignment of apertures-for-mounting 403 may match a height alignment of apertures-in-mounting-ear 309. In some embodiments, sidewall 401 may comprise a predetermined quantity of aperture-for-mounting 403. In some embodiments, the predetermined quantity of aperture-for-mounting 403 may be match the quantity of mounting-ears 307 (e.g., two). In some embodiments, the predetermined quantity of aperture-for-mounting 403 may be match the quantity of apertures-in-mounting-ear 309 (e.g., two or four).

Continuing discussing FIG. 4A, in some embodiments, sidewall 401 may comprise at least one mounting-height-marker 405. In some embodiments, sidewall 401 may comprise one or more mounting-height-marker 405. In some embodiments, sidewall 401 may comprise two (2) opposing mounting-height-markers 405. In some embodiments, mounting-height-marker 405 may be a set of dimensional indicating markings on an exterior of sidewall 401 that may show a range of predetermined and different heights that housing-can 221 may be mounted at, with respect to mounting-frame 201.

Continuing discussing FIG. 4A, in some embodiments, housing-can 221 may comprise a lid 407. In some embodiments, lid 407 may be lid of housing-can 221. In some embodiments, lid 407 may be located a top 409 of sidewall 401 (and/or of housing-can 221). In some embodiments, top 409 may be a top of sidewall 401, a top of lid 407, or a top of housing-can 221. In some embodiments, lid 407 may be attached to top 409. In some embodiments, lid 407 may at least substantially (mostly) close off an upper/to opening of sidewall 401, when lid 407 is attached to top 409. In some embodiments, lid 407 may be at least substantially solid and without breaks or openings, except at predetermined locations of lid 407, such as, but not limited to, connection-for-ground 411 and/or aperture-for-knockout 413.

Continuing discussing FIG. 4A, in some embodiments, housing-can 221, lid 407, and/or sidewall 401 may comprise connection-for-ground 411. In some embodiments, connection-for-ground 411 may be structure configured to receive attachment of electrical wiring/cabling for a purpose of completing a ground/grounding circuit.

Continuing discussing FIG. 4A, in some embodiments, housing-can 221, lid 407, and/or sidewall 401 may comprise at least one aperture-for-knockout 413. In some embodiments, aperture-for-knockout 413 may be a through hole that passes entirely through a thickness of sidewall 401 and/or of lid 407. In some embodiments, aperture-for-knockout 413 may be configured to permit passage of electrical conduit, wiring, cabling, portions thereof, combinations thereof, and/or the like.

Continuing discussing FIG. 4A, in some embodiments, housing-can 221, lid 407, and/or sidewall 401 may comprise a knockout-cover 415 for each aperture-for-knockout 413 of housing-can 221. In some embodiments, knockout-cover 415 may cover over and block aperture-for-knockout 413. In some embodiments, knockout-cover 415 may be intended to be removed (permanently) when a given aperture-for-knockout 413 may be desired to be used. In some embodiments, applying greater than a predetermined minimum amount of force to knockout-cover 415 may knockout that knockout-cover 415 from its associated aperture-for-knockout 413, making that aperture-for-knockout 413 available for use.

Continuing discussing FIG. 4A, in some embodiments, housing-can 221, lid 407, and/or sidewall 401 may comprise at least one marking 417. In some embodiments, marking 417 may be located on exterior and/or interior surfaces of housing-can 221, lid 407, and/or sidewall 401. In some embodiments, marking 417 may display at least some form of predetermined information, such as, but not limited to, a trademark, a manufacturer, a serial number, a model number, a part number, a product name, patent status, patent information, rating information, sizing information, test status information, listing information, status information, registration information, compliance information, regulatory approval information, ground symbol, portions thereof, combinations thereof, and/or the like.

Continuing discussing FIG. 4A, in some embodiments, bottom 419 may be a bottom of housing-can 221 and/or of sidewall 401. In some embodiments, bottom 419 may be disposed opposite from top 409. In some embodiments, bottom 419 may have one or more notches in bottom 419, such as, but not limited to notch 421 and/or notch 423. In some embodiments, notch 421 and/or notch 423 may be a notch in bottom 419. In some embodiments, notch 421 may be in vertical/colinear alignment with aperture-for-mounting 403. In some embodiments, aperture-for-mounting 403 may be located directly vertically above notch 421. In some embodiments, directly below each aperture-for-mounting 403 may be one notch 421. In some embodiments, a notch 421 on bottom 419 may be opposing another/different notch 421 on bottom 419 (see also, FIG. 4B and/or FIG. 4D). In some embodiments, notch 423 may be associated with tab 425. In some embodiments, tab 425 may not be visible in FIG. 4A, but is visible in FIG. 4B and in FIG. 4D. In some embodiments, notch 423 may not be directly located below aperture-for-mounting 403.

Figure 4B:
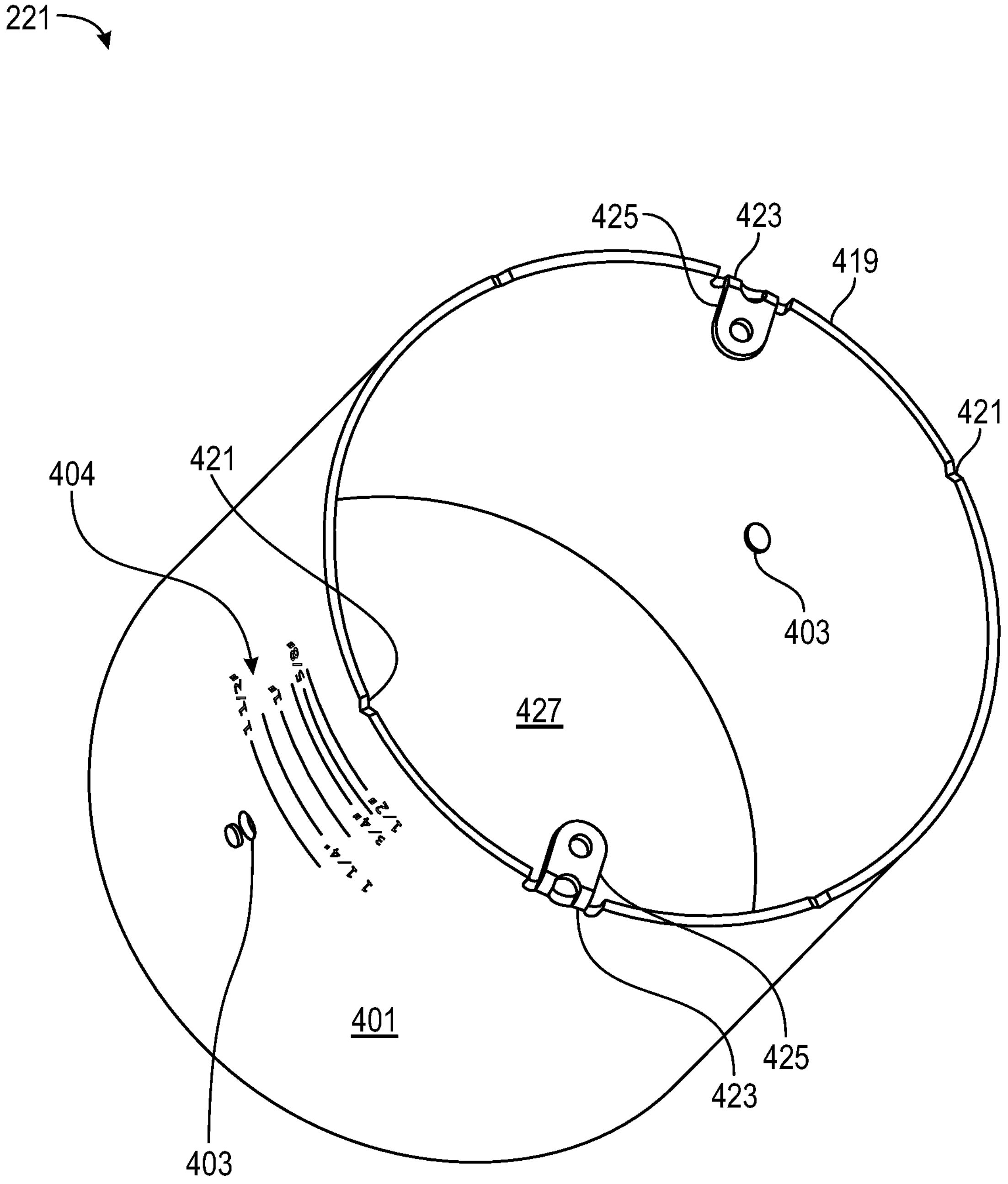
FIG. 4B is a bottom perspective view of just the housing-can of FIG. 4A.

FIG. 4B is a bottom perspective view of just housing-can 221 (shown without other parts/components of recessed-lighting-assembly 200). In some embodiments, housing-can 221 and/or sidewall 401 may comprise a tab 425 for each notch 423. In some embodiments, housing-can 221 and/or sidewall 401 may comprise at least one tab 425. In some embodiments, housing-can 221 and/or sidewall 401 may comprise one or more tab 425. In some embodiments, housing-can 221 and/or sidewall 401 may comprise two (2) opposing tabs 425. In some embodiments, tab 425 may extend inwards a finite, fixed, and predetermined distance from bottom 419 (from notch 423) towards an axial center of housing-can 221 and/or sidewall 401. In some embodiments, tab 425 may comprise at least one aperture. In some embodiments, tab 425 may provide structure for other components, parts, fasteners, and/or the like to (removably) attach to.

Continuing discussing FIG. 4B, in some embodiments lid 407 may comprise inside-surface-of-lid 427. At least a portion of inside-surface-of-lid 427 may be visible in FIG. 4B and in FIG. 4D. In some embodiments, inside-surface-of-lid 427 may be an inside/interior surface of lid 407. In some embodiments, at least one marking 417 may be located on inside-surface-of-lid 427. In some embodiments, connection-for-ground 411, aperture-for-knockout 413, and/or knockout-cover 415 may be visible from inside-surface-of-lid 427. In some embodiments, a notch 423 on bottom 419 may be opposing another/different notch 423 on bottom 419 (see also, FIG. 4D).

Figure 4C:
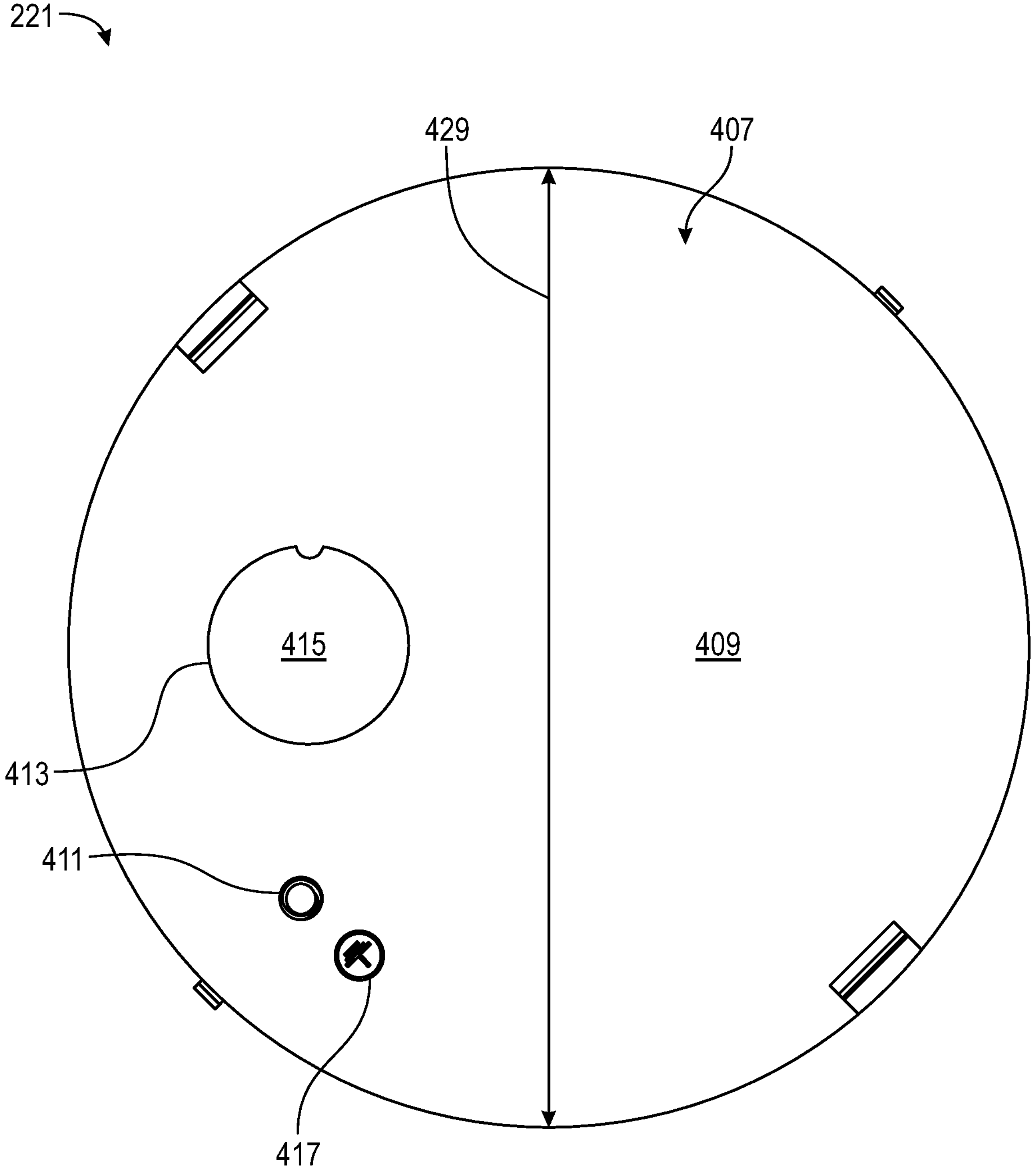
FIG. 4C is a top view of just the housing-can of FIG. 4A.

FIG. 4C is a top view of just housing-can 221 (shown without other parts/components of recessed-lighting-assembly 200). In some embodiments, housing-can 221 and/or sidewall 401 may comprise diameter 429. In some embodiments, diameter 429 may be a diameter of housing-can 221 and/or of sidewall 401. In some embodiments, diameter 429 may be an outside diameter of housing-can 221 and/or of sidewall 401. See also FIG. 4D for diameter 429.

Figure 4D:
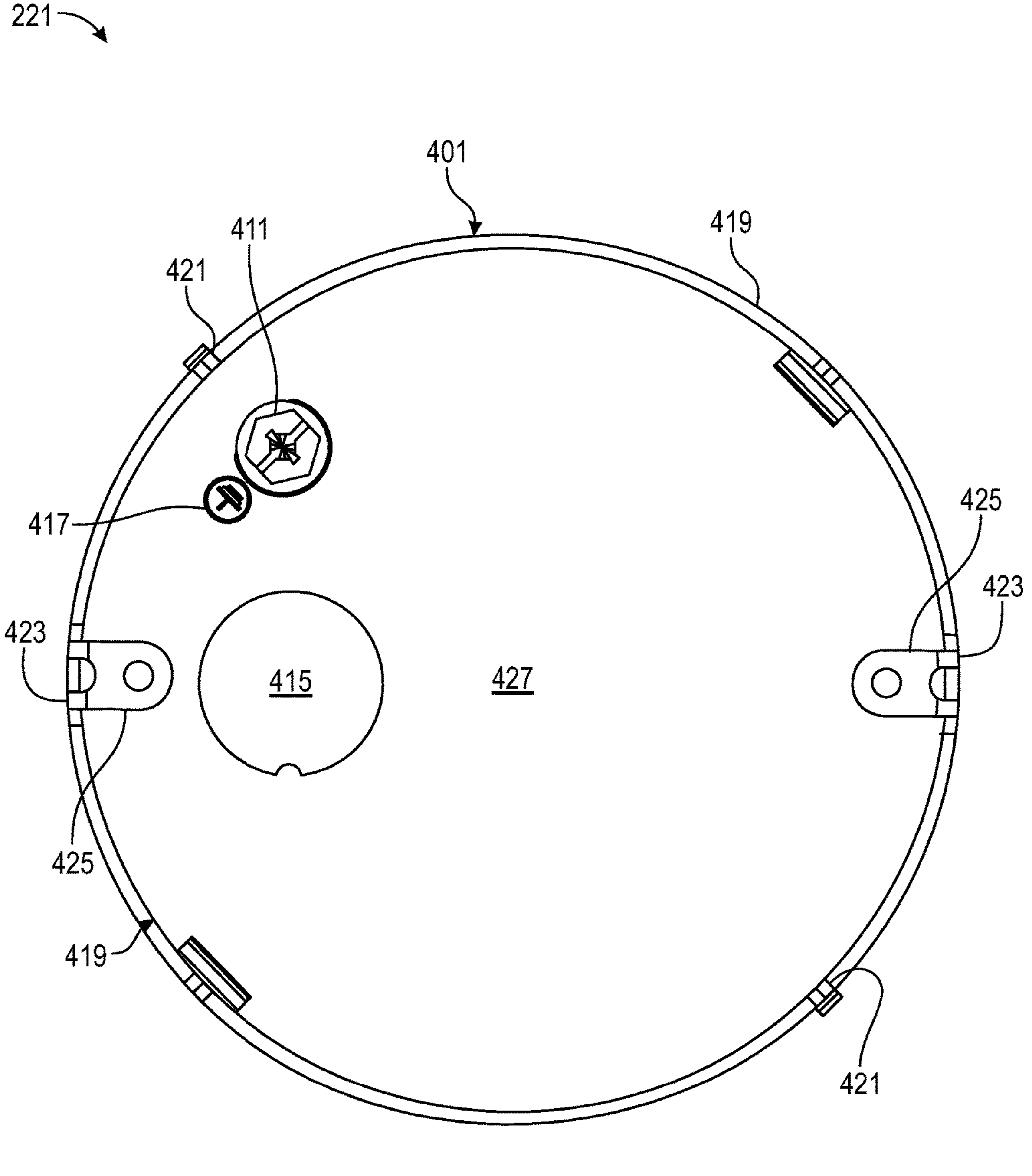
FIG. 4D is a bottom view of just the housing-can of FIG. 4A.

FIG. 4D is a bottom view of just housing-can 221 (shown without other parts/components of recessed-lighting-assembly 200). In some embodiments, FIG. 4C and FIG. 4D may be opposing views from each other.

Figure 4E:
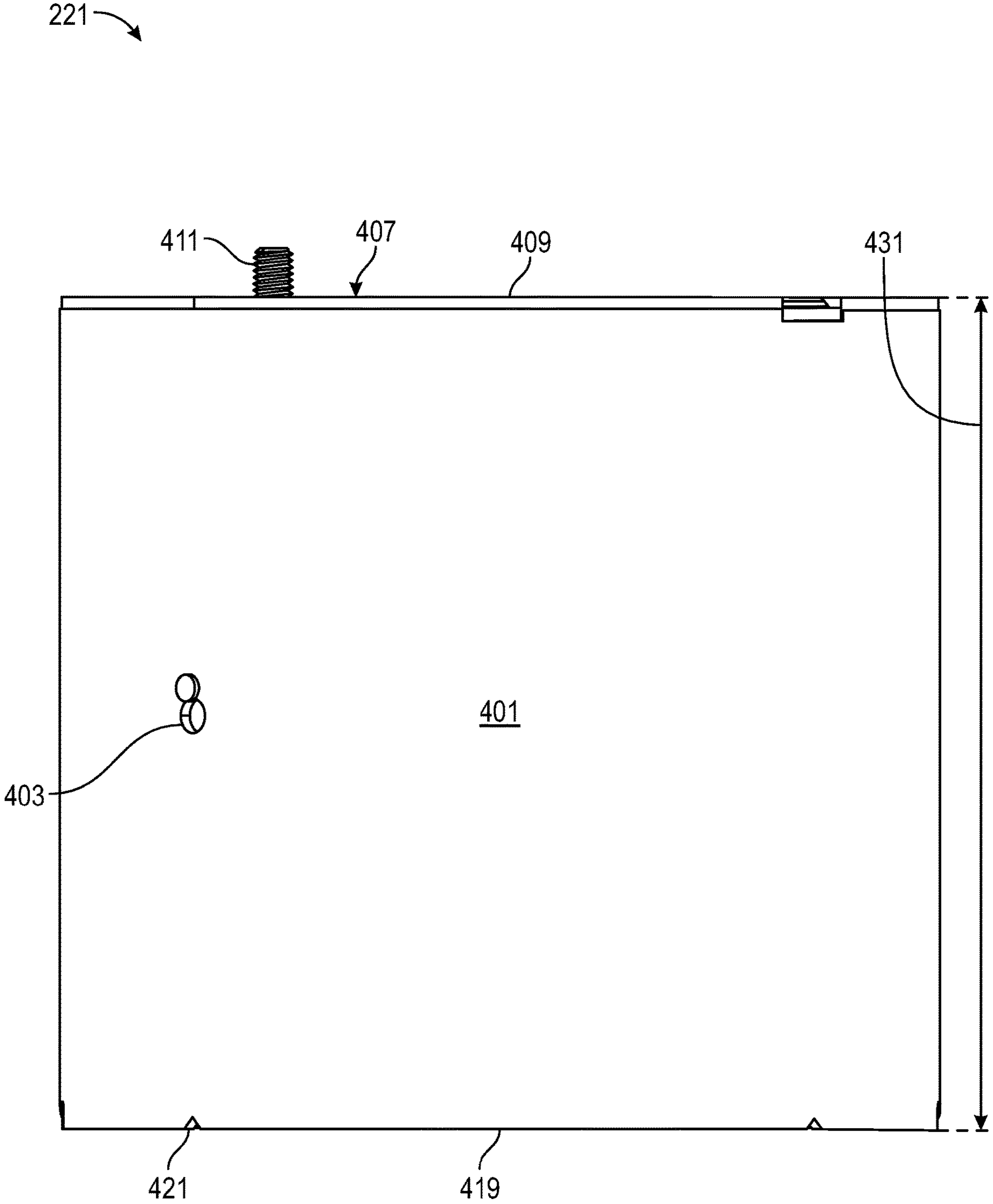
FIG. 4E is a front view of just the housing-can of FIG. 4A.

FIG. 4E is a front view of just housing-can 221 (shown without other parts/components of recessed-lighting-assembly 200). In some embodiments, housing-can 221 and/or sidewall 401 may comprise height 431. In some embodiments, height 431 may be an overall height of housing-can 221 and/or of sidewall 401. See also FIG. 4F through FIG. 4H for height 431.

Figure 4F:
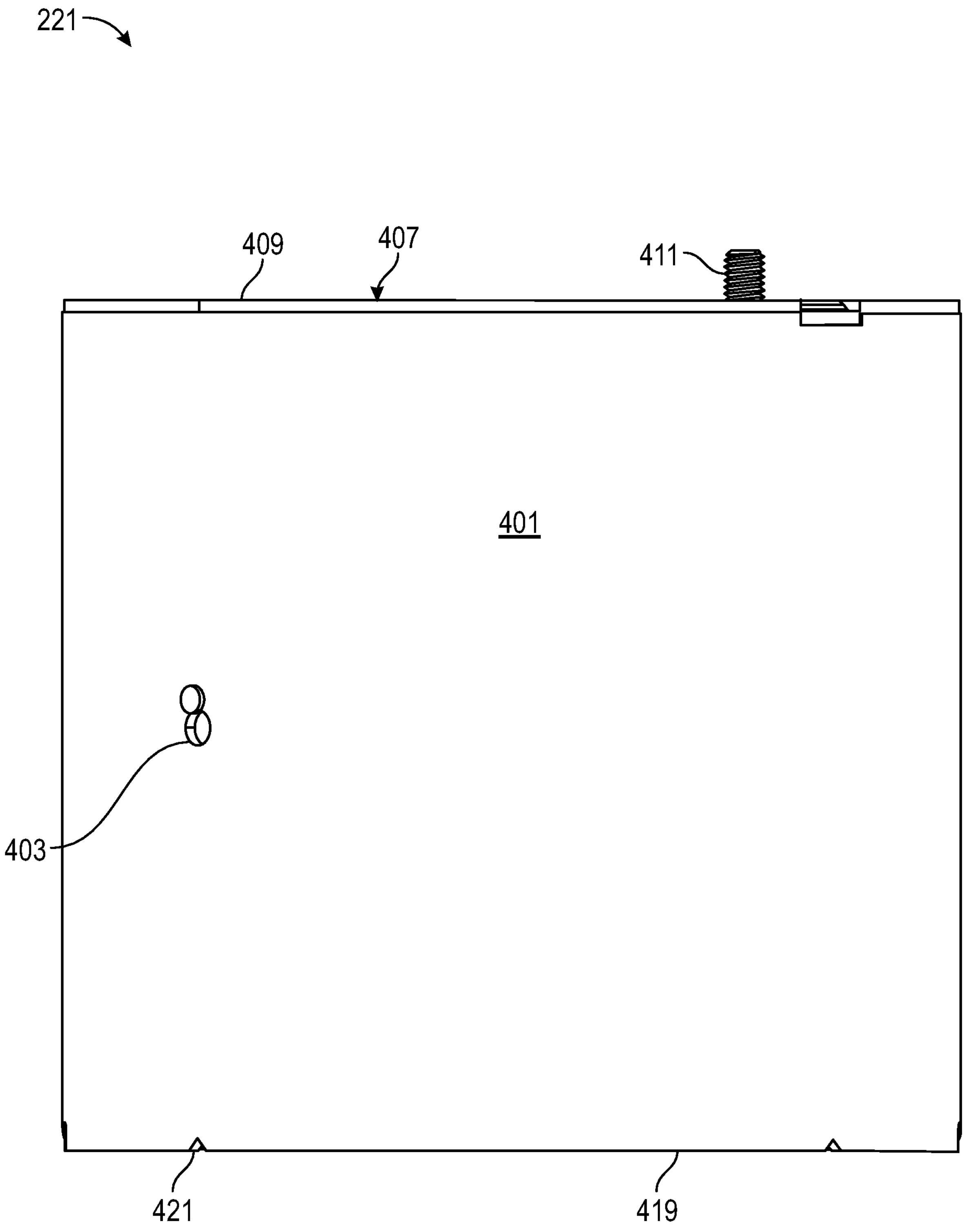
FIG. 4F is a rear (back) view of the housing-can of FIG. 4A.

FIG. 4F is a rear (back) view of just housing-can 221 (shown without other parts/components of recessed-lighting-assembly 200). In some embodiments, FIG. 4F and FIG. 4E may be opposing views from each other.

Figure 4G:
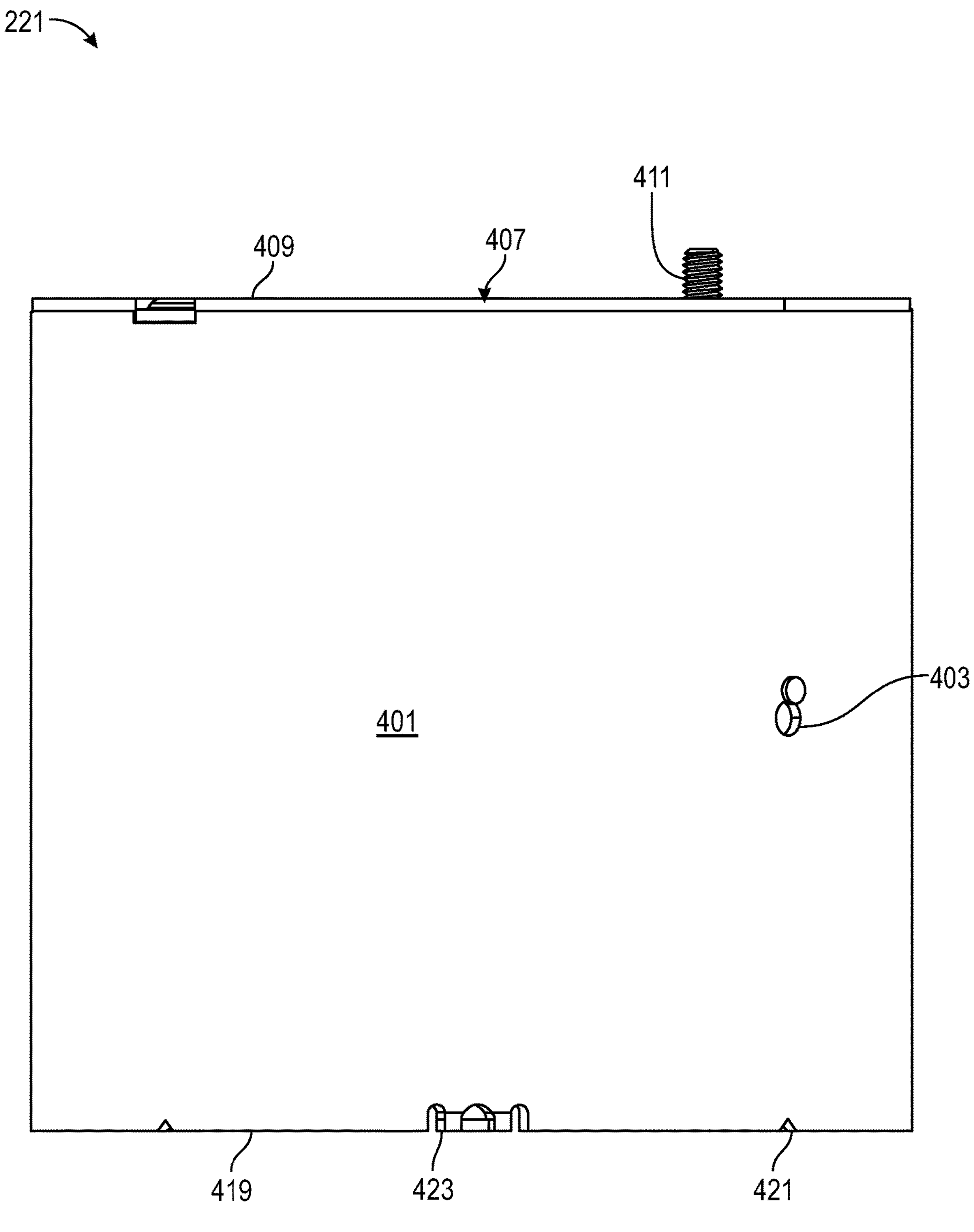
FIG. 4G is a left-side view of just the housing-can of FIG. 4A.

FIG. 4G is a left-side view of just housing-can 221 (shown without other parts/components of recessed-lighting-assembly 200).

Figure 4H:
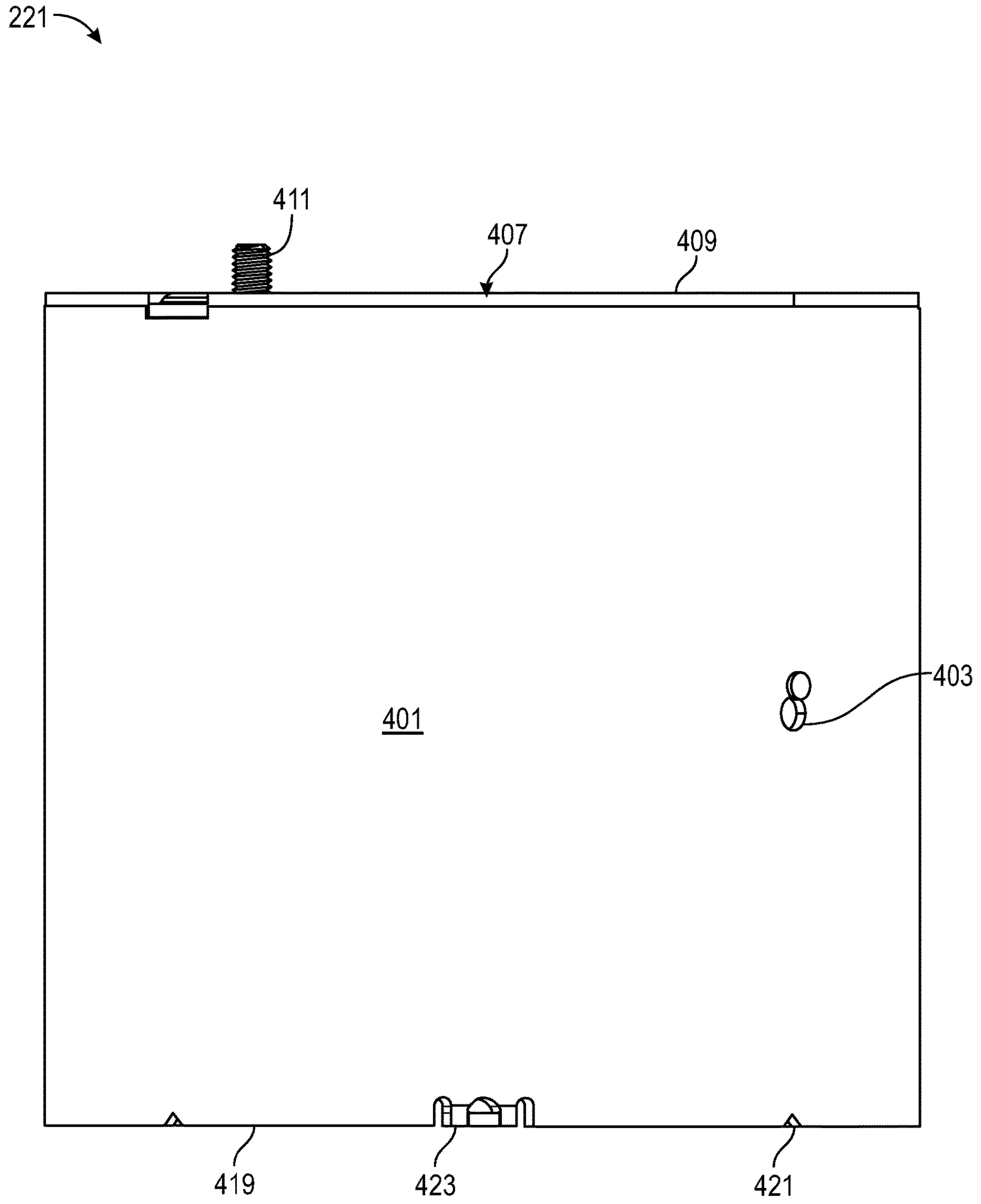
FIG. 4H is a right-side view of just the housing-can of FIG. 4A.

FIG. 4H is a right-side view of just housing-can 221 (shown without other parts/components of recessed-lighting-assembly 200). In some embodiments, FIG. 4G and FIG. 4H may be opposing views from each other.

In some embodiments, housing-can 221, sidewall 401, lid 407, knockout-cover 415, tab(s) 425, portions thereof, combinations thereof, and/or the like may be at least substantially (mostly) made from at least one same material. In some embodiments, housing-can 221, sidewall 401, lid 407, knockout-cover 415, tab(s) 425, portions thereof, combinations thereof, and/or the like may be at least substantially (mostly) made from at least one metal (and/or metal alloy), such as, but not limited to, steel.

In some embodiments, housing-can 221, sidewall 401, lid 407, knockout-cover 415, tab(s) 425, portions thereof, combinations thereof, and/or the like may be at least partially to fully colored, painted, coated, powder coated, galvanized, portions thereof, combinations thereof, and/or the like.

In some embodiments, sidewall 401, tab(s) 425, portions thereof, combinations thereof, and/or the like may be integral with each other, that is, of a single article of manufacture.

In some embodiments, housing-can 221 may comprise at least one of: sidewall 401, aperture-for-mounting 403, mounting-height-marker 405, lid 407, top 409, connection-for-ground 411, aperture-for-knockout 413, knockout-cover 415, marking 417, bottom 419, notch 421, notch 423, tab 425, inside-surface-of-lid 427, diameter 429, height 431, portions thereof, combinations thereof, and/or the like. In some embodiments, housing-can 221 may comprise one or more of: sidewall 401, aperture-for-mounting 403, mounting-height-marker 405, lid 407, top 409, connection-for-ground 411, aperture-for-knockout 413, knockout-cover 415, marking 417, bottom 419, notch 421, notch 423, tab 425, inside-surface-of-lid 427, diameter 429, height 431, portions thereof, combinations thereof, and/or the like.

Note, in some embodiments, housing-can 221 of this patent application may be replaced and/or modified with any of the housing-cans of the following U.S. patents D927430, D922331, D902160, 10876721, D892069, and U.S. Pat. No. 10,295,163; and/or with any of the housing-cans of the following two (2) published U.S. patent application Ser. Nos. 17/068,618 and 16/790,345 as long as the resulting housing-can is still configured for (removable) attachment to mounting-ear(s) 307.

Recessed lighting assemblies and portions thereof, including mounting-frames (and portions thereof), have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A mounting-frame configured for use in a recessed lighting assembly, wherein the mounting-frame comprises:

a main-planar-member that is substantially flat and planar along a top-surface and along a bottom-surface, wherein the top-surface is disposed opposite from the bottom-surface and separated from the bottom-surface by a thickness of the main-planar-member;

an aperture-for-housing-can that is a hole within the main-planar-member that is configured to receive at least a portion of a housing-can; and two mounting-ears that extend orthogonally above the top-surface, wherein the two mounting-ears extend from opposing sides of the aperture-for-housing-can, wherein the two mounting-ears are configured for attachment to the housing-can; wherein the two mounting-ears are formed from material of the main-planar-member such that the two mounting-ears and the main-planar-member are integral with each other being of a same article of manufacture, wherein the two mounting-ears are formed from two elongate cutouts in the main-planar-member, wherein a length of one of the two elongate cutouts points at a main corner of the main-planar-member;

wherein the housing-can is configured to house at least one light source.

2. The mounting-frame according to claim 1, wherein the other of the two elongate cutouts does not point at any of the main corners of the main-planar-member.

3. The mounting-frame according to claim 1, wherein the one of the two elongate cutouts that points at the main corner of the main-planar-member is also proximate to that main corner.

4. The mounting-frame according to claim 1, wherein the two mounting-ears lay upon a same linear line when the main-planar-member is viewed from above.

5. The mounting-frame according to claim 4, wherein same linear line runs diagonally from one main corner of the main-planar-member.

6. The mounting-frame according to claim 5, wherein same linear line does not run into any other main corners of the main-planar-member.

7. The mounting-frame according to claim 1, wherein when the housing-can is attached to the mounting-ears, a height of the mounting-ears extends along a sidewall of the housing-can to half or more of a height of the housing-can.

8. The mounting-frame according to claim 1, wherein each of the two mounting-ears has two apertures, wherein each aperture selected from the two apertures is configured to receive at least a portion of a fastener.

9. The mounting-frame according to claim 1, wherein the aperture-for-housing-can has a circular shape.

10. The mounting-frame according to claim 1, wherein the mounting-frame further comprises a skirt; wherein the skirt extends orthogonally below and from the bottom-surface along the aperture-for-housing-can, wherein the skirt is configured to guide the housing-can into a desired position with respect to the mounting-frame.

11. The mounting-frame according to claim 10, wherein the skirt has a right cylindrical shape.

12. The mounting-frame according to claim 1, wherein the main-planar-member is substantially rectangular in shape when viewed from above.

13. The mounting-frame according to claim 1, wherein the main-planar-member comprises structures for attaching to a junction-box; wherein with respect to a length of the main-planar-member, the aperture-for-housing-can and the structures for attaching to the junction-box occupy different halves of the main-planar-member.

14. The mounting-frame according to claim 1, wherein the main-planar-member comprises structures for attaching to a junction-box; wherein when the junction-box is attached to the main-planar-member via the structures for attaching to the junction-box, the junction-box rests on top of the top-surface of the main-planar-member such that a bottom of the junction-box and the top-surface are at a same level of height.

15. The mounting-frame according to claim 1, wherein the mounting-frame further comprises a perimeter-fence that is located around an outside boundary of the main-planar-member, wherein the perimeter-fence has a height that extends substantially orthogonally away from the top-surface or from the bottom-surface.

16. The mounting-frame according to claim 15, wherein the perimeter-fence is formed from exterior portions of the main-planar-member by at least bending those exterior portions, such that the perimeter-fence and the main-planar-member are integral with each other being of the same article of manufacture.

17. The mounting-frame according to claim 15, wherein the perimeter-fence comprises cutouts that are bent to form brackets-for-hanger-bars, wherein the brackets-for-hanger-bars are configured for attachment to at least one hanger-bar.

18. The mounting-frame according to claim 17, wherein any exterior side of the perimeter-fence, via the brackets-for-hanger-bars, is configured for attachment to the at least one hanger-bar.

19. The mounting-frame according to claim 1, wherein the mounting-frame is configured for attachment to a junction-box, wherein when the housing-can and the junction-box are attached to the mounting-frame, the housing-can and the junction-box are separated from each other by a finite, fixed, and predetermined distance.

20. The mounting-frame according to claim 19, wherein the finite, fixed, and predetermined distance is at least as long as two adjacent cutouts with brackets-for-hanger-bars on a perimeter-fence of the mounting-frame.

* * * * *